United States Patent
Marshall et al.

(10) Patent No.: US 11,115,457 B2
(45) Date of Patent: Sep. 7, 2021

(54) HTTP TRANSACTION RETRIES

(71) Applicant: Apple Inc., Cupertino, CA (US)

(72) Inventors: Scott M. Marshall, Cupertino, CA (US); Franco Travostino, San Jose, CA (US); Darren S. Litzinger, Los Gatos, CA (US); Vijay Venkataraman, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/834,055

(22) Filed: Mar. 30, 2020

(65) Prior Publication Data

US 2020/0382576 A1 Dec. 3, 2020

Related U.S. Application Data

(60) Provisional application No. 62/855,655, filed on May 31, 2019, provisional application No. 62/855,679, filed on May 31, 2019.

(51) Int. Cl.
*H04L 29/08* (2006.01)
*H04L 12/26* (2006.01)
(Continued)

(52) U.S. Cl.
CPC .......... *H04L 67/02* (2013.01); *G06F 11/1474* (2013.01); *H04L 29/0809* (2013.01);
(Continued)

(58) Field of Classification Search
CPC .. G06F 11/1474; G06F 11/1402; G06F 11/14; H04L 67/02; H04L 29/0809;
(Continued)

(56) References Cited

U.S. PATENT DOCUMENTS 8,964,757 B2 2/2015 Matson
9,009,260 B2 4/2015 Ewanchuk
(Continued)

FOREIGN PATENT DOCUMENTS

WO WO2014077753 A1 5/2014
WO WO2017176247 A1 10/2017
(Continued)

OTHER PUBLICATIONS

M. Belshe et al. "Request for Comments (RFC) 7540: Hypertext Transfer Protocol Version 2 (HTTP/2)", Internet Engineering Task Force (IETF), May 2015, 96 pages. (Year: 2015).*
(Continued)

*Primary Examiner* — George C Neurauter, Jr.
(74) *Attorney, Agent, or Firm* — Kowert, Hood, Munyon, Rankin & Goetzel, P.C.

(57) ABSTRACT

Apparatuses, systems, and methods for a wireless device to perform methods for mitigating HTTP transaction errors for a data connection. The wireless device may establish a data connection over a first network interface of the wireless device at an HTTP layer of the wireless device. A transport connection may support the data connections and may support multiple HTTP transactions. An advisory signal may be received at the HTTP layer and, responsive to the advisory signal including first information, the HTTP layer may determine that at least a portion of the HTTP transactions can be (safely) retried. The HTTP layer may terminate, without notifying the application layer, the portion of HTTP transactions and may initiate, via a second transport connection established over a second network interface, retries of the first portion of HTTP transactions.

20 Claims, 16 Drawing Sheets

(51) Int. Cl.
| | |
|---|---|
| *H04W 76/10* | (2018.01) |
| *H04W 36/00* | (2009.01) |
| *H04W 36/26* | (2009.01) |
| *G06F 11/14* | (2006.01) |
| *H04L 29/06* | (2006.01) |
| *H04W 80/12* | (2009.01) |

(52) U.S. Cl.
CPC ............ *H04L 43/08* (2013.01); *H04L 67/141* (2013.01); *H04L 67/143* (2013.01); *H04L 67/147* (2013.01); *H04L 69/329* (2013.01); *H04W 36/0022* (2013.01); *H04W 36/26* (2013.01); *H04W 76/10* (2018.02); *H04L 69/16* (2013.01); *H04W 80/12* (2013.01)

(58) Field of Classification Search
CPC ..... H04L 43/08; H04L 67/141; H04L 67/143; H04L 69/16; H04L 69/329; H04W 36/0022; H04W 36/26; H04W 76/10; H04W 80/12
See application file for complete search history.

(56) References Cited

U.S. PATENT DOCUMENTS

| | | |
|---|---|---|
| 9,414,248 B2 | 8/2016 | Kovvali |
| 9,538,220 B2 | 1/2017 | ElArabawy |
| 9,756,543 B2 | 9/2017 | Nagaraj |
| 9,769,723 B2 | 9/2017 | Singh |
| 9,872,338 B2 | 1/2018 | Jechoux |
| 9,913,189 B2 | 3/2018 | Tinnakomrisuphap |
| 9,936,428 B2 | 4/2018 | Faccin |
| 9,992,723 B2 | 6/2018 | Katar |
| 10,070,348 B2 | 9/2018 | Begen |
| 10,250,655 B2 | 4/2019 | Hurst |
| 2009/0316581 A1 | 12/2009 | Kashyap |
| 2011/0106969 A1* | 5/2011 | Choudhury ........... H04L 65/608 709/236 |
| 2014/0019635 A1 | 1/2014 | Reznik |
| 2015/0055463 A1* | 2/2015 | Alisawi ................. H04W 76/10 370/230 |
| 2016/0094608 A1 | 3/2016 | Sundararajan |
| 2016/0156520 A1 | 6/2016 | Scully |
| 2016/0219458 A1 | 7/2016 | Kubota |
| 2017/0171319 A1 | 6/2017 | Hall |
| 2017/0223401 A1 | 8/2017 | Xu |
| 2017/0264488 A1 | 9/2017 | Ben Ami |
| 2017/0317894 A1 | 11/2017 | Dao |
| 2017/0373950 A1 | 12/2017 | Szilagyi |
| 2018/0241679 A1 | 8/2018 | Muscariello |
| 2018/0242218 A1 | 8/2018 | Muscariello |
| 2018/0255486 A1 | 9/2018 | Kumar |
| 2019/0069303 A1 | 2/2019 | Yerramalli |
| 2019/0075493 A1 | 3/2019 | Melander |
| 2019/0132353 A1 | 5/2019 | Rodniansky |
| 2019/0215729 A1 | 7/2019 | Oyman |
| 2020/0383012 A1* | 12/2020 | Tseng .................... H04L 67/141 |

FOREIGN PATENT DOCUMENTS

| | | |
|---|---|---|
| WO | WO2018084663 A1 | 5/2018 |
| WO | WO2018125686 A2 | 7/2018 |

OTHER PUBLICATIONS

Wu, Jiyan et al.: "Distortion-Aware Concurrent Multipath Transfer for Mobile Video Streaming in Heterogeneous Wireless Networks"; IEEE Transactions on Mobile Computing, vol. 14, Issue 4; Jul. 8, 2014; 14 pages.

* cited by examiner

HTTP TRANSACTION RETRIES

PRIORITY DATA

This application claims benefit of priority to U.S. Provisional Application Ser. No. 62/855,655, titled "HTTP Transaction Retries", filed May 31, 2019, and to U.S. Provisional Application Ser. No. 62/855,679, titled "Application Mobility Enhancements", filed May 31, 2019, each of which is hereby incorporated by reference in its entirety as though fully and completely set forth herein.

FIELD

The present application relates to wireless devices, and more particularly to apparatus, systems, and methods for a wireless device to perform a variety of cellular communication techniques.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for a wireless station to predict and mitigate data connection interruptions (such as data/media stalls) during and/or prior to establishment of the data connection with a network.

The techniques described herein may be implemented in and/or used with a number of different types of devices, including but not limited to cellular phones, tablet computers, wearable computing devices, portable media players, and any of various other computing devices.

In some embodiments, a wireless device may perform a method for mitigating data stalls. The method may include the wireless device establishing, at an HTTP layer of the wireless device, a data connection over a first network interface of the wireless device. The data connection may be initiated by an application executing at an application layer of the wireless device. The application layer may compare an available duration of data in a data buffer associated with the data connection to a first threshold. At least one lower layer of the wireless device may be notified of an emergency deadline by the application layer in response to the available duration approaching the first threshold. The emergency deadline may be based, at least in part, on current radio network conditions and the first threshold. The emergency deadline may indicate a time (e.g., an absolute time) at which point the data buffer may become exhausted and a data stall may occur. In response to the notification, the at least one lower layer may perform one or more remedial actions to avoid and/or mitigate the data stall. In some embodiments, the one or more remedial actions may include any, any combination of, and/or all of a network layer of the wireless device re-selecting to a second network interface prior to the emergency deadline, a Wi-Fi interface layer scanning for a new basic service set identifier (BSSID) based on the emergency deadline, a cellular interface attempting a radio access technology upgrade procedure based on the emergency deadline, the cellular interface reserving additional channels (e.g., activating carrier aggregation) for increased throughput based on the emergency deadline, and/or the cellular interface attempting to re-select to a less congested cell. In some embodiments, the cellular interface may inform the network about the emergency deadline, thereby aiding in network prioritization of scheduling grants to wireless device until the emergency deadline. In some embodiments, the second network interface may have a higher cost than the first network interface, where cost may be measured based, at least in part, on battery demands of an interface and/or a monetary cost associated with use of an interface (e.g., cellular).

In some embodiments, a wireless device may perform a method for mitigating hypertext transport protocol (HTTP) transaction errors for a data connection. The method may include the wireless device establishing a data connection over a first network interface of the wireless device. The data connection may be established at an HTTP layer of the wireless device and may be supported by a first transport connection (e.g., a TCP connection, a TLS/TCP connection, UDP connection, a QUIC connection and/or any other type of connection that may support an HTTP transaction as defined herein) connection. The first transport connection may support multiple HTTP transactions. The data connection may be initiated by an application executing at an application layer of the wireless device. An advisory signal may be received at the HTTP layer. The contents of the advisory signal may be based, at least in part, on network radio conditions for the first network interface and at least one second network interface. The advisory signal may be generated by a monitoring entity executing on the wireless device. The HTTP layer may determine, responsive to the advisory signal including first information (e.g., a tier 2 advisory signal), that at least a first portion of the HTTP transactions can be retried without error and terminate, without notifying the application layer, the first portion of HTTP transactions. Additionally, the HTTP layer may initiate, via a second transport connection established over the at least one second network interface, retries of the first portion of HTTP transactions and send HTTP transaction results to the application layer.

In some embodiments, the HTTP layer may determine, responsive to the advisory signal including first information (e.g., a tier 2 advisory signal), that one or more of the HTTP transactions cannot be retried without error and may flag the first transport connection as not suitable for reuse by subsequent HTTP transactions. In such embodiments, the HTTP layer may send HTTP transaction results and/or errors to the application layer. In some embodiments, the HTTP layer may flag, responsive to the advisory signal including second information, the first transport connection as not suitable for reuse by subsequent HTTP transactions and send HTTP transaction results and/or errors to the application layer.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
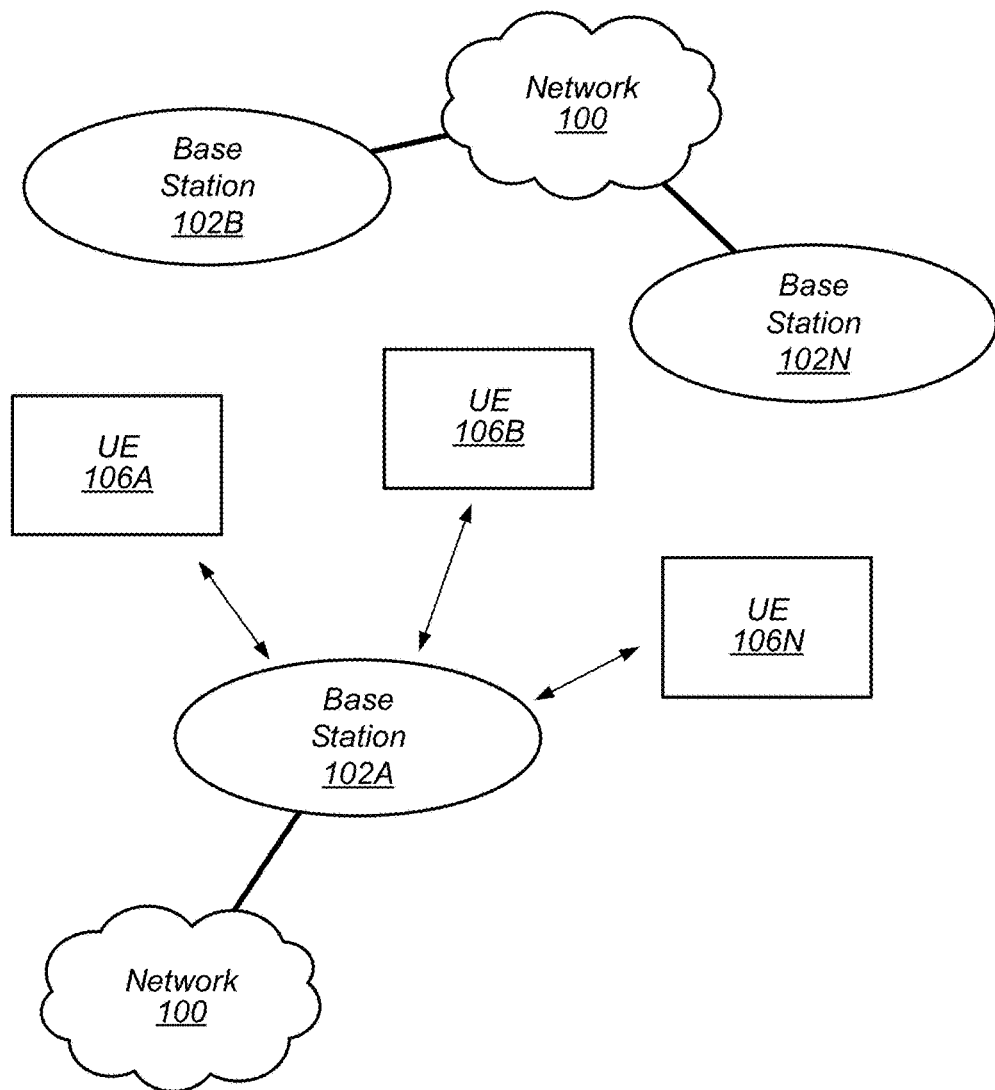
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, optical, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

HTTP Transaction—The term "HTTP transaction" may refer to an exchange between an HTTP client (requester) and an HTTP server (responder). For example, the exchange may include the HTTP client transmitting (or sending) an HTTP request, such as an HTTP-GET query, to the HTTP server and receiving (from the HTTP server) an HTTP response, e.g., a response to the HTTP-GET query. A failure of an HTTP transaction may include the HTTP client not receiving a response from the HTTP server, receiving an incomplete response from the HTTP server, and/or not receiving a response within a specified period of time (e.g., a timeout period). HTTP transactions may occur over transmission control protocol (TCP) connections as well as an encrypted byte stream (e.g., a transport layer security (TLS) protocol connection) occurring over top of the TCP connection. Additionally, HTTP transactions may occur over user datagram protocol (UDP) connections as well as an encrypted byte stream (e.g., a quick UDP internet connection (QUIC)) occurring over top of the UDP connection.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
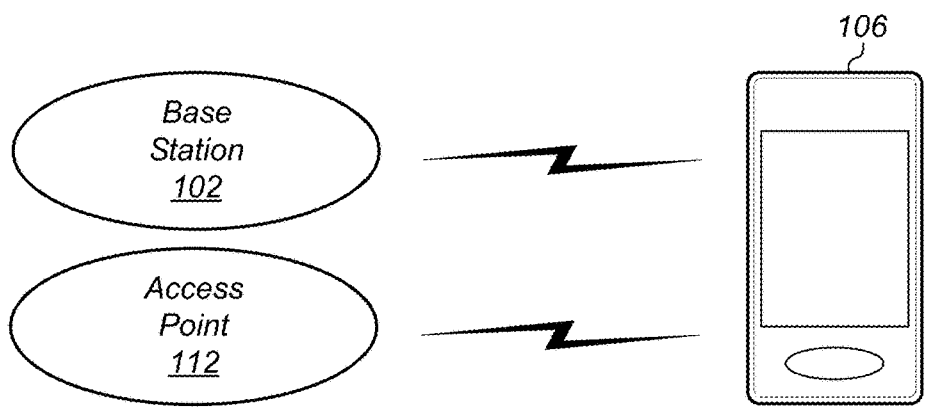
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 2:
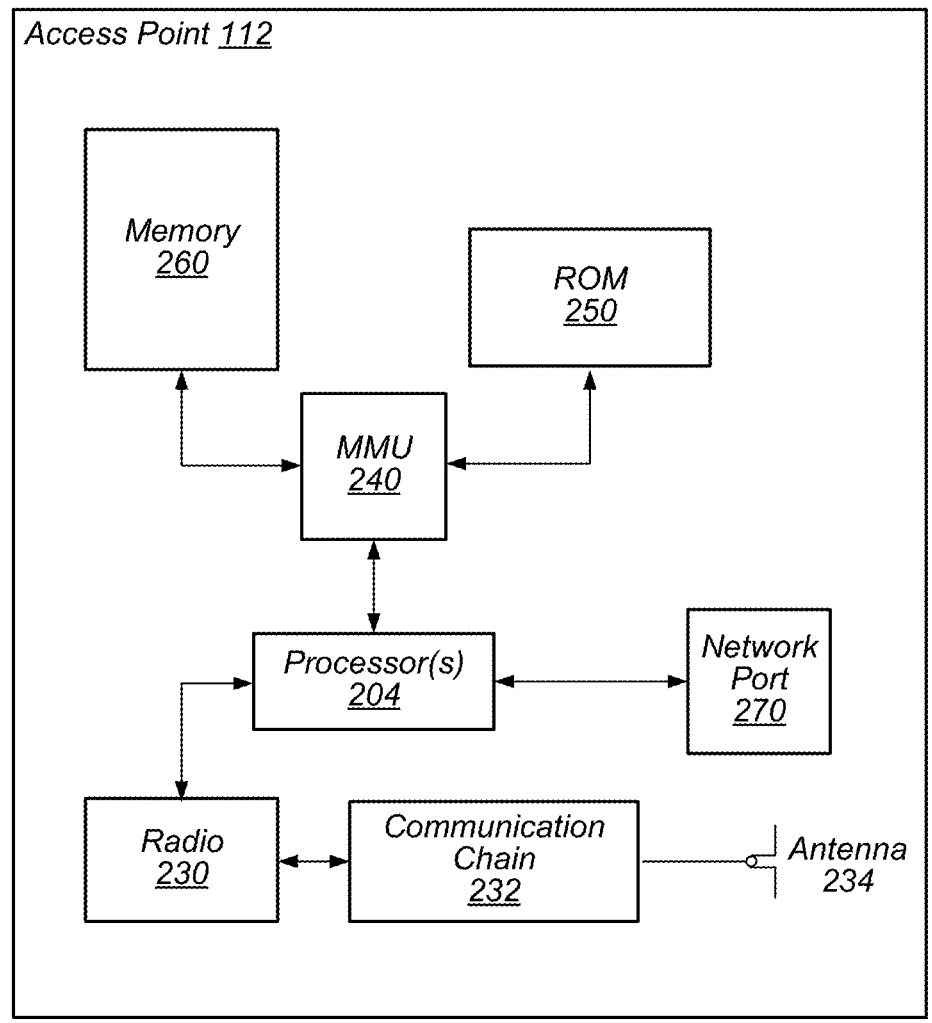
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., IEEE 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to implement methods for prediction and mitigation of data connection interruptions (such as data/media stalls) during and/or prior to establishment of the data connection with a network, e.g., as further described herein.

Figure 3:
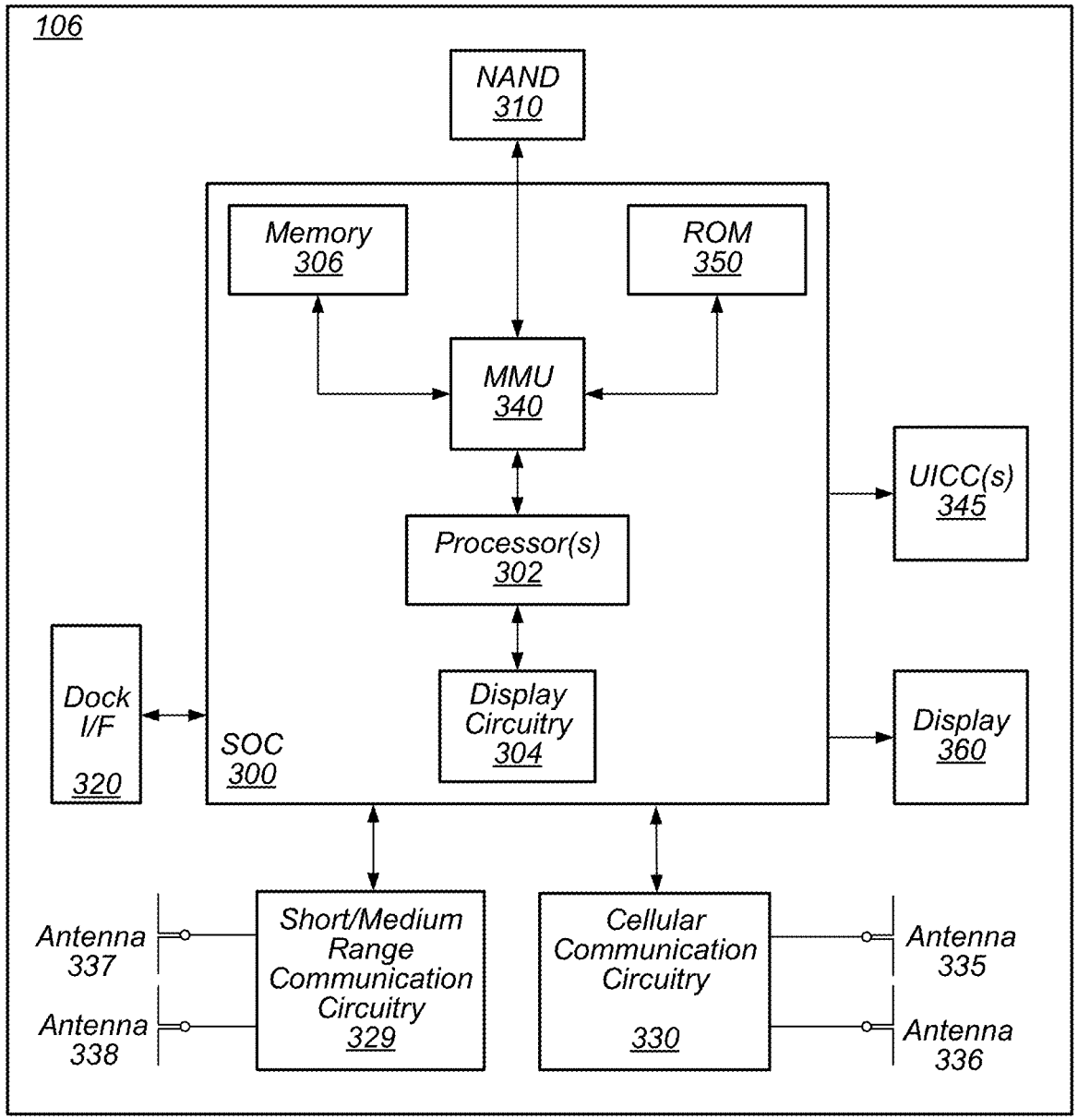
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for predicting and mitigating data connection interruptions (such as data/media stalls) during and/or prior to establishment of the data connection with a network, e.g., as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short-range wireless communication circuitry 329 may include one or more ICs that are configured to perform the functions of short-range wireless communication circuitry 329. In addition, each integrated circuit may include circuitry (e.g., first circuitry, second circuitry, etc.) configured to perform the functions of short-range wireless communication circuitry 329.

Figure 4:
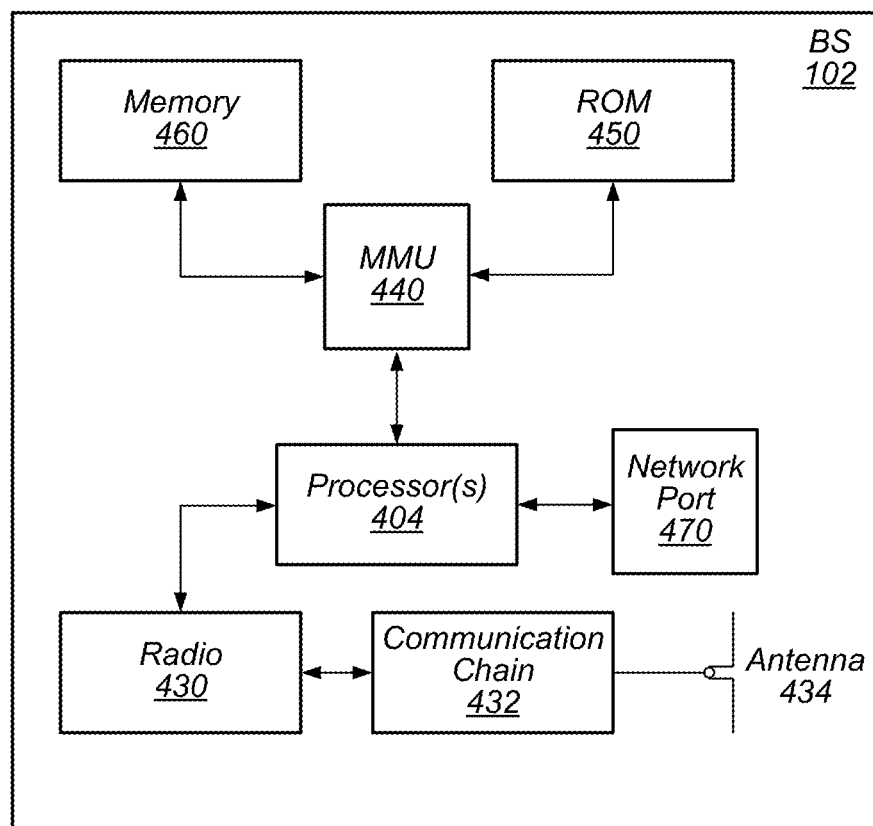
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC and/or 5GC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein, e.g., for configuring a power savings signal in fifth generation (5G) new radio (NR) networks. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
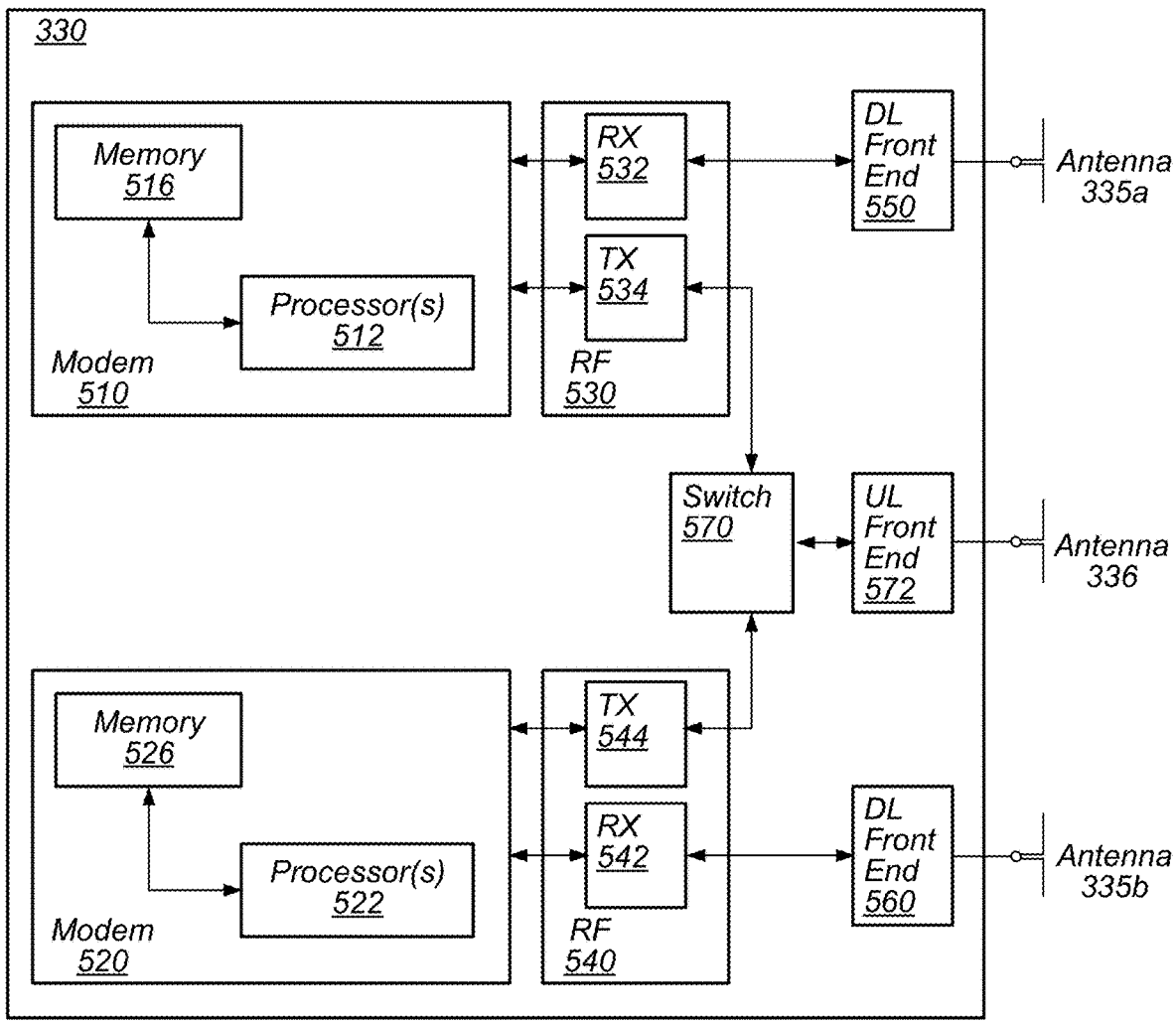
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for predicting and mitigating data connection interruptions (such as data/media stalls) during and/or prior to establishment of the data connection with a network, e.g., as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 560, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
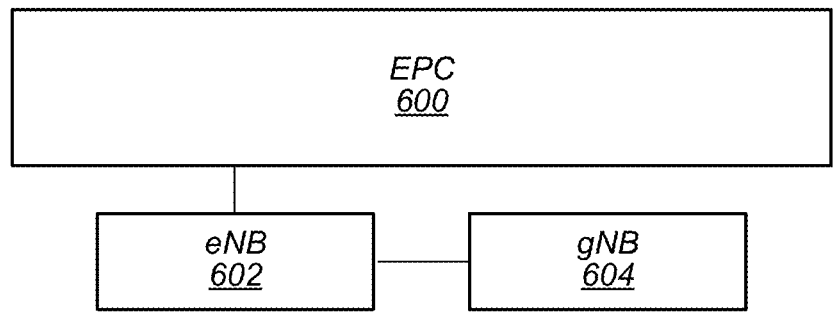
FIG. 6A illustrates an example of connections between an EPC network, an LTE base station (eNB), and a 5G NR base station (gNB).
Figure 6B:
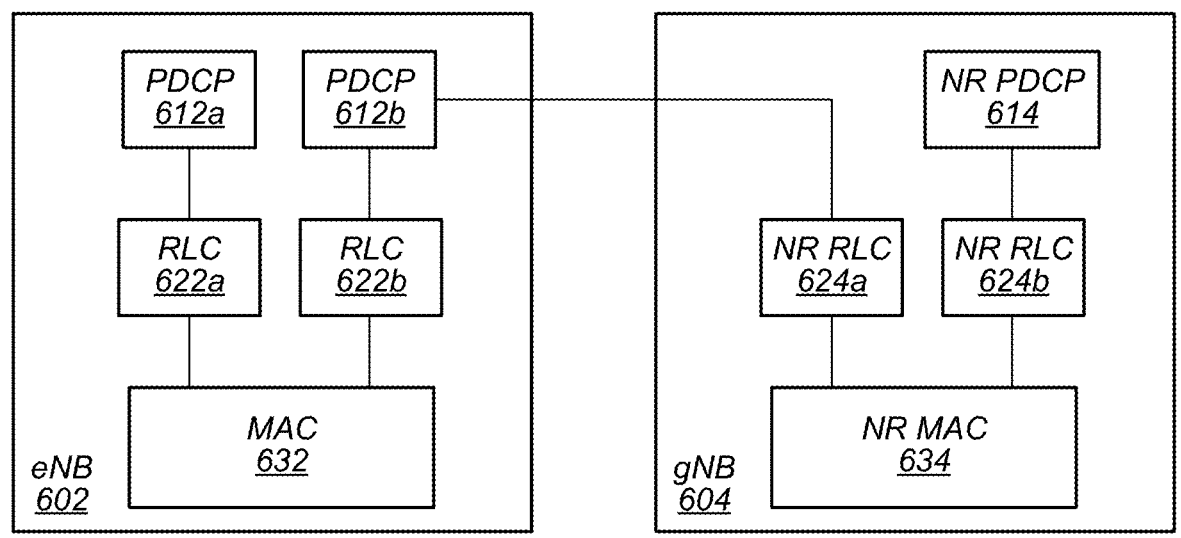
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user (or data) plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
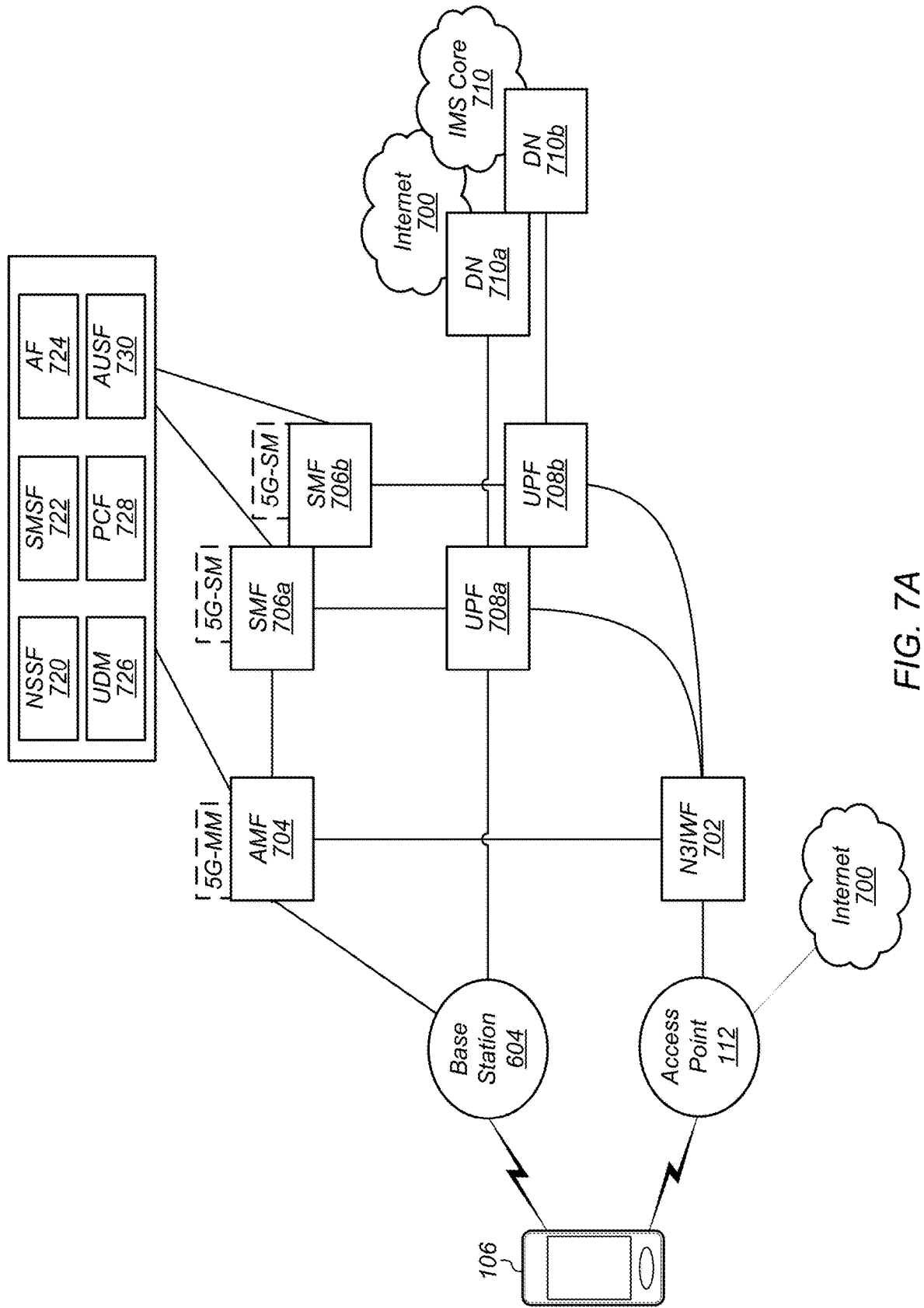
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 704 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
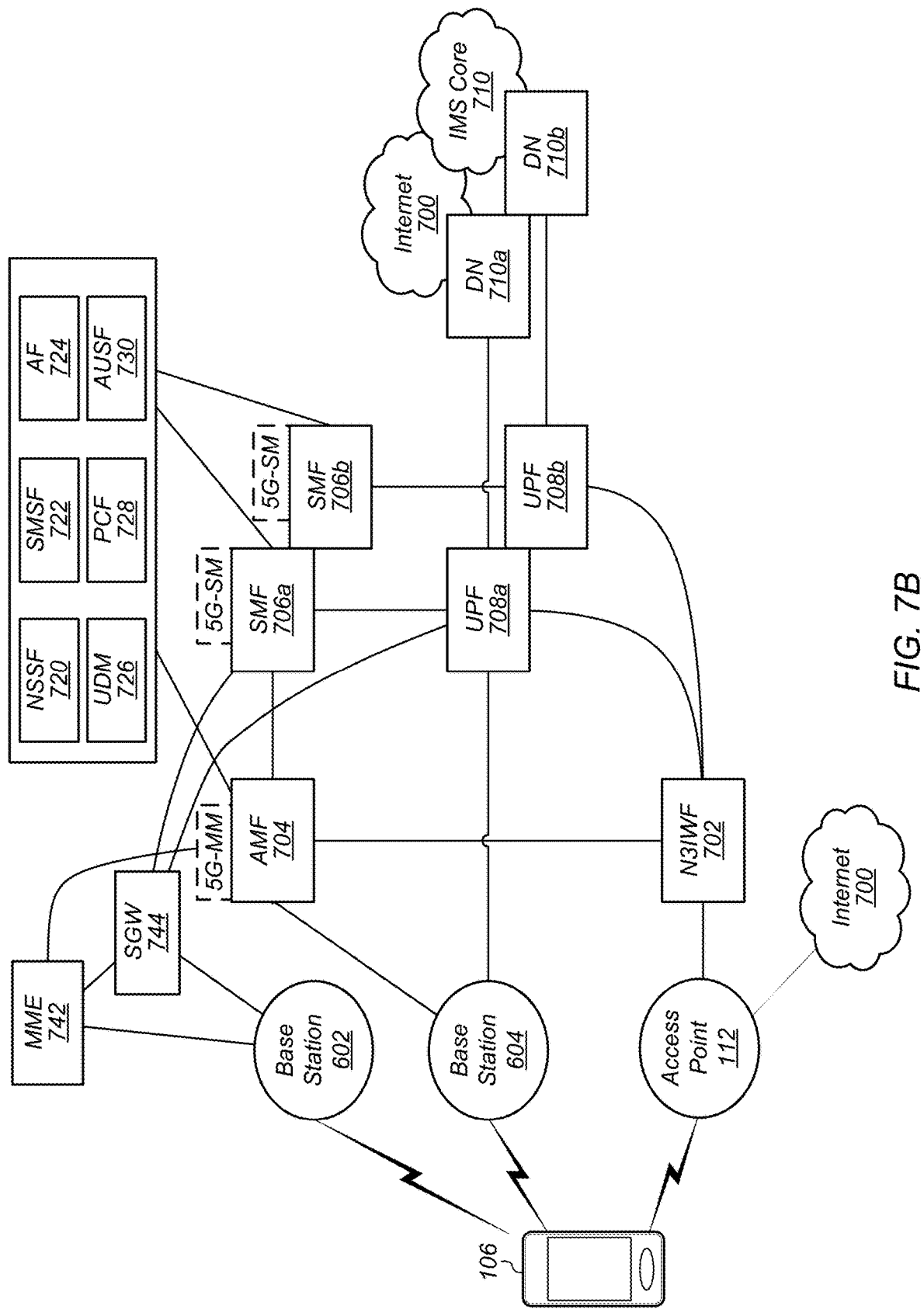
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 704 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to predict and mitigate data connection interruptions (such as data/media stalls) during and/or prior to establishment of the data connection with a network, e.g., as further described herein.

Figure 8:
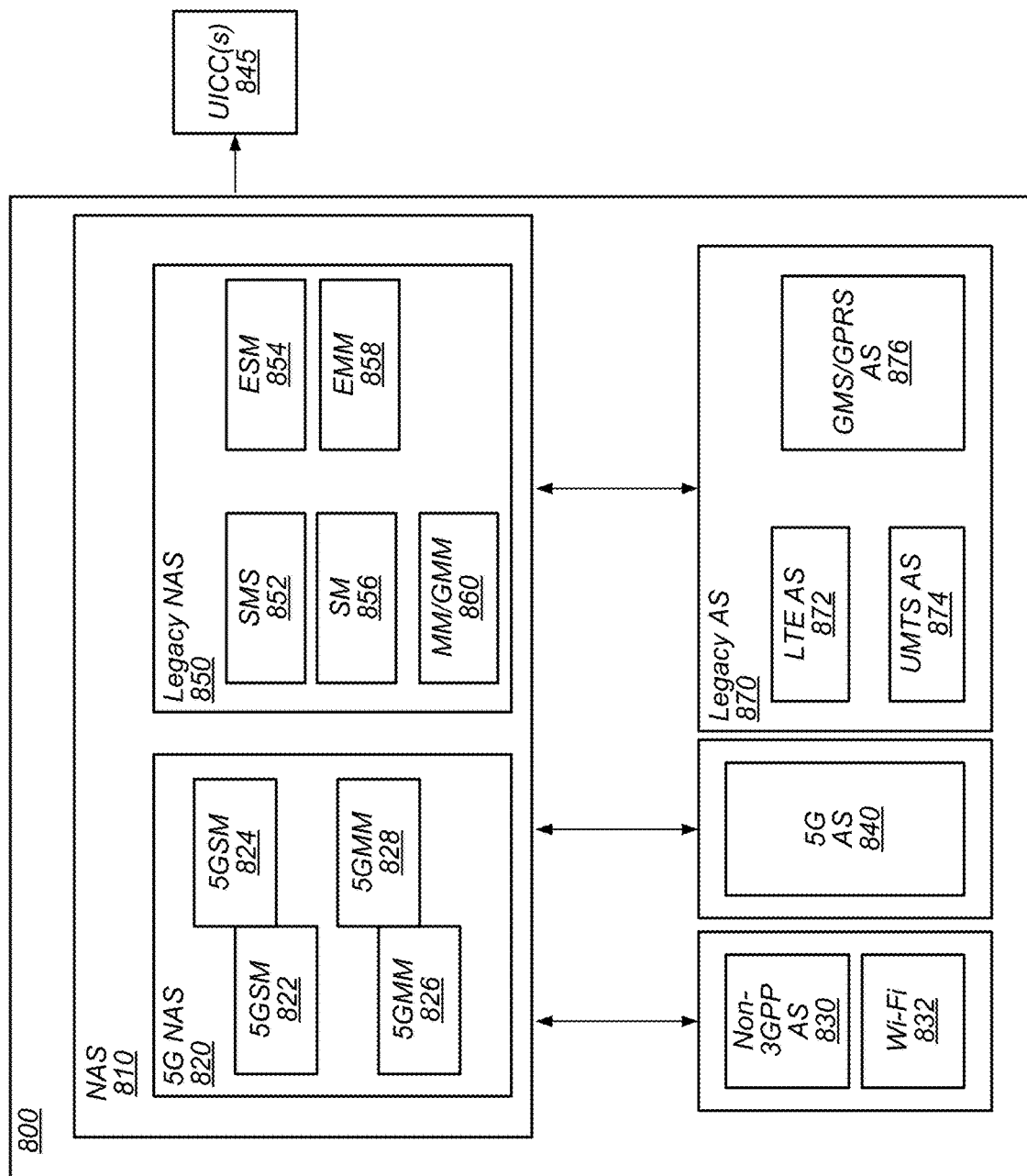
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms to predict and mitigate data connection interruptions (such as data/media stalls) during and/or prior to establishment of the data connection with a network, e.g., as further described herein.

Enhancements for Application Mobility

In some existing implementations, when a mobile station, or UE, transitions out of Wi-Fi coverage, the mobile station may experience a data stall/media stall condition. For example, a data stall may occur when a UE does not receive a response to an HTTP-GET query, a common HTTP method used to request data from a specified resource. As another example, a media stall may occur when a buffer of media data is exhausted (e.g., data from the buffer is being read at a higher rate than data is being written to the buffer, leading to the buffer running out of data). For example, a data stall condition may occur when a mobile station transitions between Wi-Fi networks (e.g., Wi-Fi roaming), transitions from a Wi-Fi network to a cellular network, and/or transitions between cells of a cellular network. Further, during a data stall condition, a web service may hang, e.g., a webpage may not load in a web browser or a map may not refresh in a web mapping service application. As another example, streaming music or streaming video playback may pause during playback during a data and/or media stall condition. Additionally, in a data stall condition, a real-time audio-visual call may be missed, dropped, and/or paused. As a further example, an email message may not load during a data stall condition.

Additionally, in some existing implementations, recovery from a data stall condition, e.g., such as transitioning to or recovering to cellular service, may be delayed because existing cellular service recovery algorithms are periodic timer based. For example, in some instances a service recovery when baseband is in limited service may be attempted once every two minutes. In some instances, a service recovery when baseband is in limited service may be attempted once every six minutes. Similarly, in some instances, an out of service recovery may be attempted once every minute.

Furthermore, as more utilities are accessed with a mobile station in a locked state (e.g., a state in which a user interface of the mobile station has limited capabilities as compared to an unlocked state), such data stall conditions have become more prominent and recovery slowed due to a baseband processor of the mobile station being in a limited service and/or out of service state. Additionally, in some implementations, recovery may be slowed due to the baseband processor falling back to a slower than optimal RAT prior to the data stall condition occurring.

In some existing implementations, a network layer may implement a multipath transmission control protocol (MPTCP). The MPTCP may establish a virtual socket over one or more TCP connections and each TCP connection may use a different network interface, such as Wi-Fi or cellular. In some implementations, a "cheapest" interface, as measured by cost of data and battery demands of an interface (radio) (e.g., for a given wireless device, a Wi-Fi interface may generally be considered cheaper than a cellular interface) may be used. Further, more expensive interfaces may be re-selected to supplement and/or replace cheaper interfaces when a cheaper interface is unable to connect, loses its connection, and/or provides insufficient performance (e.g., latency and/or throughput). In some implementations, the network layer may autonomously select interfaces by monitoring flows over the various interfaces, however, there may be cases of false positives and/or false negatives.

For example, an intermittent problem on a cheaper interface may cause a network layer to re-select a more expensive interface. However, in this case, the intermittent problem may quickly resolve. In certain circumstances (e.g., depending on a media's buffering status), such a false positive may be a wasteful use of resources. As another example, a cheaper interface may provide consistent, but poor (e.g., slower than required) data throughput. In such instances, the network layer may not switch to a more expensive interface, thereby leading to a poor user experience due to this false negative.

In some existing implementations, a software entity may monitor traffic and attempt to assist data connections experiencing low throughput. For example, the software entity may cause a network layer to establish each new TCP connection on multiple interfaces. In such instances, when a connection is not successfully established within a certain time period, a new connection will simultaneously be attempted over more expensive interfaces, racing against the first connection. The TCP connection that is successfully established first wins the race and is used by the network layer. However, racing all connections all the time may lead to a waste of resources (e.g., powering up the cellular radio and duplicating every request when Wi-Fi is perfectly healthy). Thus, the software entity may monitor network conditions (e.g., received signal strength indication (RSSI), estimated roundtrip time) to make a balancing decision. Thus, when network conditions are poor, the software entity may increase the aggressiveness of the more expensive connection by reducing a head start afforded to the cheaper connection. Conversely, when network conditions are good, the connection over the expensive interface(s) may not be attempted.

In some existing implementations, such as large infrastructure Wi-Fi networks that span large areas (e.g., as are typically found in corporate settings), multiple access points (each identified with its own basic service set identifier (BSSID)) may provide service for a Wi-Fi service (identified by its service set identifier (SSID)). In such implementations, a Wi-Fi interface of a wireless station may monitor network conditions such as signal strength (e.g., RSSI) and congestion (e.g., clear channel assessment (CCA)) to periodically scan for the best BSSID, which is known as Wi-Fi roaming. Note that Wi-Fi roaming may occur without terminating a TCP flow since roaming occurs within context of the Wi-Fi service (SSID). Thus, Wi-Fi roaming may occur without disturbing any higher layers, such as the application (e.g., streaming media playback). However, scanning for new BSSIDs may incur a cost of additional radio activity (power) and temporary degradation in Wi-Fi performance.

In some implementations, a cellular interface may downgrade radio access technology (RAT) in cases such as of poor cellular signal, if an optimal RAT (e.g., LTE) is temporarily barred/blacklisted, and/or if an optimal RAT does not support a particular service (e.g., a voice call). The cellular interface may periodically scan to re-establish a higher performing RAT. In other words, the cellular interface may periodically attempt a cellular RAT upgrade (or promotion). Similar to Wi-Fi roaming, a cellular RAT upgrade may occur without terminating a TCP flow (and avoiding disturbance of any upper layer data connections, such as streaming media playback). However, attempting a RAT upgrade may incur a cost of additional radio activity (power) and a degradation of cellular performance.

Embodiments described herein provide techniques to leverage a buffer deadline to enhance throughput performance and pre-emptively avoid data stalls, e.g., during media playback. In some embodiments, based on the buffer deadline, a higher performing interface may be enabled to support a lower performance interface. For example, based on the buffer deadline, a cellular interface may be enabled to support a lower performing interface (e.g., a slower cellular connection, a Wi-Fi connection, a Bluetooth connection, and so forth). As another example, based on the buffer deadline, a second Wi-Fi association may be enabled to support a lower performing interface (e.g., a slower cellular connection, a Wi-Fi connection, a Bluetooth connection, and so forth). As a further example, a satellite interface may be enabled to support a lower performing interface (e.g., a slower cellular connection, a Wi-Fi connection, a Bluetooth connection, and so forth). Note that these examples are exemplary only and other configurations are envisioned within the scope of this disclosure.

Figure 9:
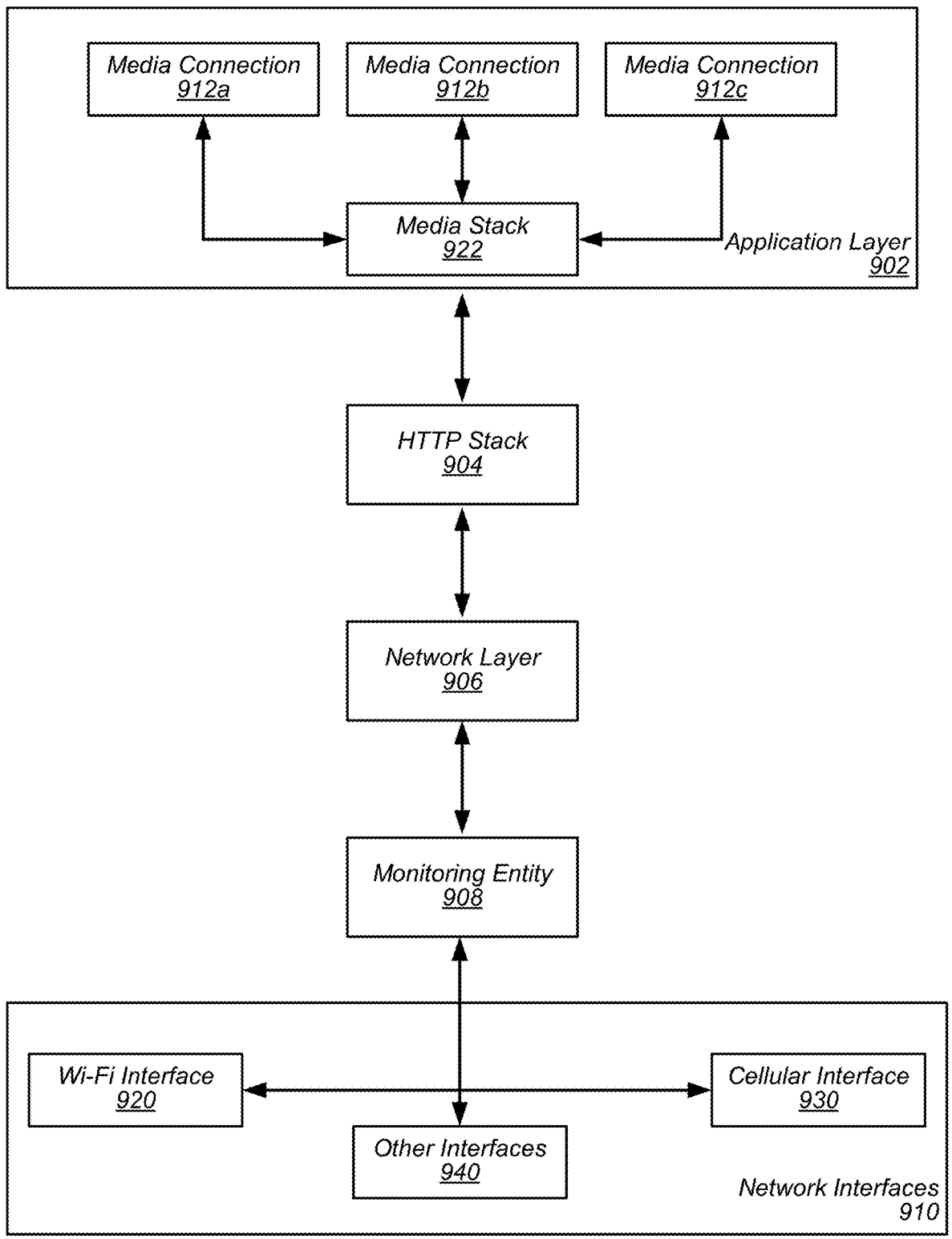
FIG. 9 illustrates an example of a high-level block diagram of an architecture of a UE, such as UE 106, according to some embodiments.

FIG. 9 illustrates an example of a high-level block diagram of an architecture of a UE, such as UE 106, according to some embodiments. The architecture shown in FIG. 9 may be used in conjunction with (or implemented with) any of the systems or devices shown in the Figures, among other devices. In various embodiments, some of the elements shown may be omitted. Additional elements may also be used as desired. As shown, this architecture may operate as follows.

As shown, media stack (or layer) 922 (e.g., a software entity, a layer of the communication architecture, and/or an application) may monitor various media/data connections 912a-c. The media/data connections 912a-c may be for various upper layer (foreground) applications. Data connections may include data sessions for an internet browser, an email application, and/or various other upper layer applications that may not require low latency data connections. Media connections may include data sessions for a video call, a streaming music service and/or a streaming video service and/or various other upper layer applications that may require low latency data connections. Media stack 922 may be included in an application layer 902 as shown. Application layer 902 may interface and communicate with a connection interface (or connection core layer), such as HTTP stack 904. HTTP stack 904 may manage HTTP connections (e.g., serving the media/data connections 912a-c). Additionally, the HTTP stack 904 may monitor responses to HTTP_GET requests, e.g., via communications with network layer (or stack) 906. Network layer 906 may include a TCP layer and may interface with Wi-Fi interface (or layer) 920 and/or cellular interface (or layer) 930 via a monitoring entity (or layer) 908 (e.g., a software entity, a layer of the communication architecture and/or an application), Thus, connection requests from media/data connections 912a-c may flow from application layer 902 (e.g., via media stack 922) to network interfaces 910 (e.g., to one of the Wi-Fi interface 920, cellular interface 930, and/or other interfaces 940 (e.g., Bluetooth, virtual private network (VPN), and so forth)) via the various layers of the UE.

In some embodiments, the HTTP stack 904 may communicate status of responses to HTTP_GET requests to monitoring entity 908. Monitoring entity 908 may monitor HTTP response header timeouts on a per upper layer application basis. In other words, monitoring entity 908 may monitor HTTP response header timeouts for each media/data connection (e.g., each of media/data connections 912a-c). In some embodiments, the monitoring entity 908 may track a number of HTTP response header timeouts per time period. In other words, the monitoring entity 908 may track a number of HTTP response header timeouts for a given time period. Further, when the number of HTTP response header timeouts exceeds a threshold for a time period, the monitoring entity 908 may report an aggregated data stall hint to cellular interface 930 (e.g., a cellular baseband processor). Upon receiving the aggregated data stall hint, cellular interface 930 may take one or more actions to mitigate a data/media stall.

In some embodiments, media stack 922 (e.g., a streaming audio and/or video playback stack) may monitor an available duration of playable media to drive an emergency deadline that may be provided to lower layers of the UE. The emergency deadline may provide a time by which data must be received in order to avoid buffer exhaustion. In some embodiments, each underlying layer (e.g., HTTP stack 904, network layer 906, monitoring entity 908, and/or network interfaces 910) may use the emergency deadline information to drive various actions in a just in time manner to avoid poor user experience, such as audio/video stalls and/or degraded audio/video quality.

For example, in some embodiments, a media processing layer, such as media stack 922, may send (transmit) an urgency signal (and/or deadline information) to network layers, such as HTTP stack 904. In some embodiments, HTTP stack 904 may map multiple urgency signals for one or more HTTP transactions into an urgency signal (and/or deadline information) for each TCP connection. The HTTP stack 904 may send (transmit) this urgency signal (and/or deadline information) to network layers, such as network layer 906, monitoring entity 908, and/or network interfaces 910. The urgency signal may indicate a deadline as an absolute time. In some embodiments, the urgency signal (or emergency deadline/deadline information) may be based, at least in part, on a duration of buffered media. In some embodiments, the network layers may interpret the urgency signal to imply that a user may experience poor audio/video quality or stall at the absolute time. In some embodiments, the urgency signal may be propagated to each underlying layer and each underlying layer may take remedial action(s) to avoid adverse audio/video quality in a just in time manner, e.g., as further described herein.

In some embodiments, media stack 922 may update a value of the deadline in a periodic manner, e.g., every 5, 10, 15, and/or 20 seconds. In some embodiments, the periodicity of the update may be based, at least in part, on current playback conditions. For example, if a time horizon (e.g., an amount of remaining playback time) is greater than a threshold value, the deadline may be disabled. However, as a time horizon approaches the threshold, e.g., within a specified percentage of the threshold, the deadline may be updated more frequently. For example, if the time horizon is within 10% of the threshold, the deadline may be updated every 10 seconds. Additionally, if the time horizon is within 1% of the threshold, the deadline may be updated every 5 seconds. Note that these values are exemplary only and other values may be considered within the scope of this disclosure. In some embodiments, the time horizon may be converted to an absolute time value. In some embodiments, concurrent and/or conflicting time horizon requirements (e.g., multiple media/data connections with independent buffers and deadlines) may be resolved by using a minimum time horizon to trigger remedial actions, e.g., as further described herein.

In some embodiments, the urgency signal may indicate a deadline until acceptable latency becomes an unacceptable delay. In some embodiments, the urgency signal may include information such as bytes required by the deadline and/or average bitrate. In some embodiments, the urgency signal may include information associated with a cost function of user experience to describe (or weight) an impact associated with a possible media/data stall.

In some embodiments, network layer 906 may use the urgency signal to re-select to a more expensive interface in a just in time manner. For example, an intermittent problem may occur on a cheaper interface being used for a data connection (e.g., such as one of media connections 912*a-c*), however, the urgency signal may not include a deadline for the data connection, e.g., a time horizon of a buffer associated with the data connection may not be within a certain percentage of a threshold to trigger a deadline, thus the network layer 906 may continue using the cheaper interface. Additionally, in the event that the urgency signal does include a deadline for the data connection, the network layer 906 may delay re-selection to a more expensive interface until the deadline drops below the network layer 906's expected resolution time. For example, the network layer 906 may need to power up the more expensive interface and establish a new TCP connection. In such instances, the network layer 906 may estimate an amount of time required for these actions and wait until the deadline approaches this amount of time before performing the re-selection.

As another example, network layer 906 may initially choose a cheaper interface for a data connection (e.g., such as one of media connections 912*a-c*), however, the cheaper interface may not provide sufficient throughput (e.g., the cheaper interface may not provide a sufficient bitrate to stream video). Thus, the network layer 906 may initially detect a consistent throughput over the cheaper interface and not re-select to a more expensive interface. However, upon receiving an urgency signal from media stack 922, the network layer 906 may take action (e.g., re-selection to a more expensive interface capable of higher throughput) once a time deadline (indicated by the urgency signal) approaches an amount of time required to take action (e.g., powering up the more expensive interface and establishing a new TCP connection).

Note that in some embodiments, the network layer 906 may wait until the deadline is equal to an estimated amount of time required for re-selection. In other embodiments, the network layer 906 may wait until the deadline is within a percentage (e.g., approaches) the estimated amount of time required for re-selection. For example, if the estimated time required for re-selection is 5 seconds, the network layer 906 may wait until the deadline is 5 seconds and/or the network layer 906 may wait until the deadline is within 1% (e.g., 5.05 seconds), 5% (e.g., 5.25 seconds), 10% (e.g., 5.5 seconds), and so forth.

Figure 10:
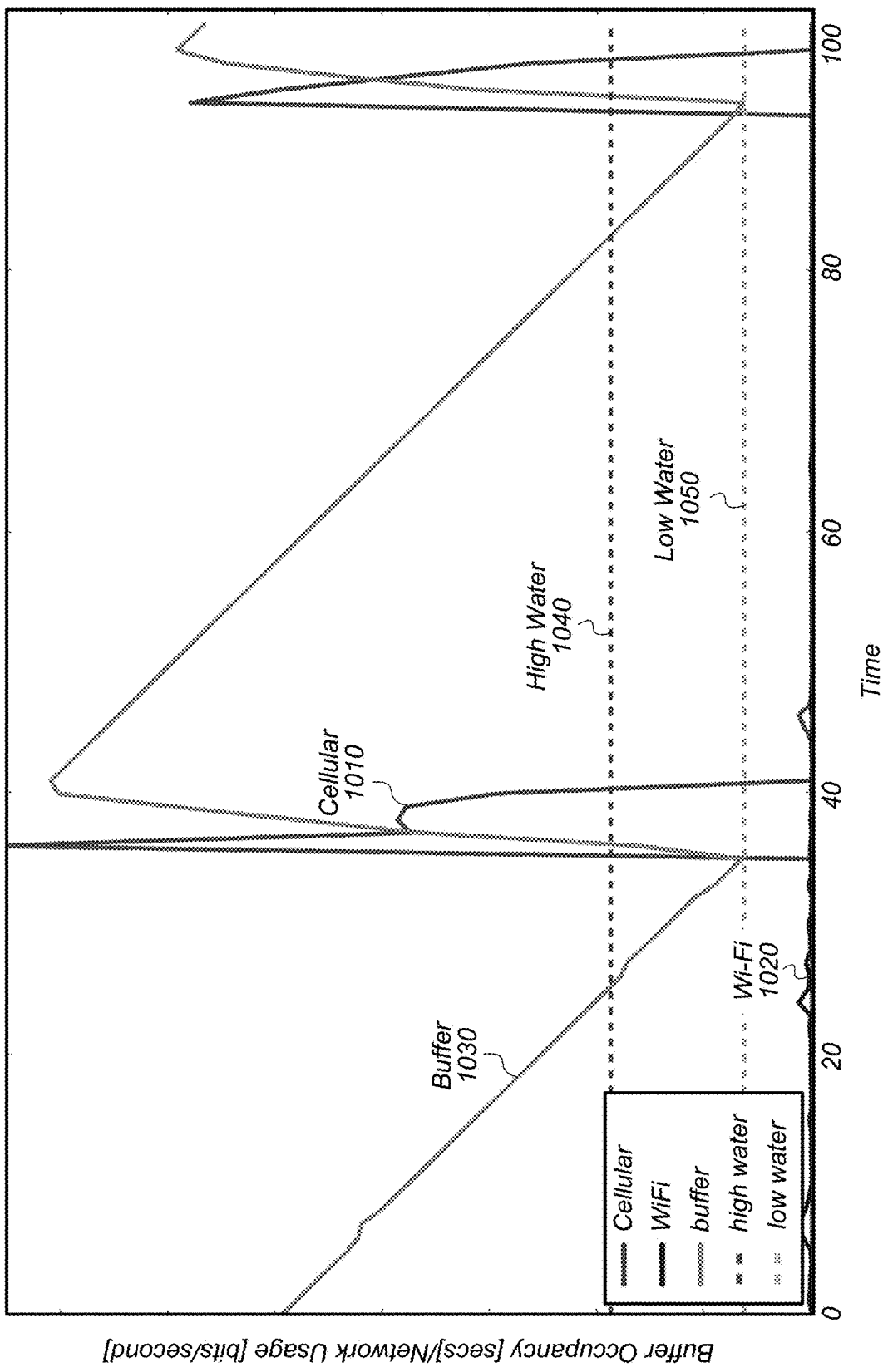
FIG. 10 illustrates an example of a network layer re-selecting between interfaces based on a data buffer level, according to some embodiments.

FIG. 10 illustrates an example of a network layer, such as network layer 906, re-selecting between interfaces based on a data buffer level, according to some embodiments. As shown, Wi-Fi 1020 represents throughput, which in is low performing due to a lack of Wi-Fi coverage (e.g., a user is at an edge of a Wi-Fi coverage area). Cellular 1010 represents cellular throughput and, as shown, although cellular coverage is good, the network layer refrains from using it (due to interface cost). Further, when not in use, a cellular interface may be transitioned to a low power mode (e.g., an RRC IDLE state) and/or turned off to conserve battery. In the example illustrated by FIG. 10, a media connection is ongoing and buffer 1030 represents buffered media duration. Note that if the buffered media duration reaches 0, playback may stall, yielding a poor user experience. Additionally shown are high water level 1040 and low water level 1050. An urgency signal may be asserted periodically as buffer 1030 drops below high water level 1040. As shown, the network layer may time activation of the cellular interface such that the buffer 1030 does not drop below the low water level 1050. Activation of the cellular interface may lead to higher throughput and an increase in buffer 1030. As buffer 1030 increases past high water level 1040, the urgency signal may be de-asserted and the cellular interface may begin to power down (leading to lower throughput). The process may be repeated, as shown.

In some embodiments, monitoring entity 908 may receive the urgency signal from media stack 922 and use information included in the urgency signal to optimize support of low throughput Wi-Fi conditions. In some embodiments, the monitoring entity may only provide support for connections made on behalf of streaming media playback that is asserting an urgency signal.

In some embodiments, Wi-Fi interface 920 may receive the urgency signal from media stack 922 and use information included in the urgency signal to optimize support of Wi-Fi roaming. In some embodiments, the urgency signal may provide application-specific information to enhance Wi-Fi roaming. In some embodiments, based on a deadline included in the urgency signal, Wi-Fi interface 920 may scan for a new BSSID, e.g., prior to scanning related to general Wi-Fi roaming. Additionally, based on the deadline included in the urgency signal, Wi-Fi interface 920 may delay scanning for a new BSSID until warranted by the deadline, thereby reducing scanning costs.

In some embodiments, cellular interface 930 may receive the urgency signal from media stack 922 and use information included in the urgency signal to optimize support of a RAT upgrade procedure. In some embodiments, the urgency signal may provide application specific information to enhance RAT upgrade. In some embodiments, based on a deadline included in the urgency signal, cellular interface 930 may attempt a RAT upgrade, e.g., prior to periodic scanning related to general RAT upgrade procedures. Additionally, based on the deadline included in the urgency signal, cellular interface 930 may delay a RAT upgrade procedure until warranted by the deadline, thereby reducing scanning costs. In some embodiments, the information included in the urgency signal may include an indication that application layer 902 launched an application with low latency requirements, e.g., such as a video call and/or a streaming media application.

In some embodiments, cellular interface 930 may receive the urgency signal from media stack 922 and use information included in the urgency signal to reserve additional channels for increased throughput (e.g., early/fast carrier aggregation). In some embodiments, the information may include bytes and/or bitrate and the cellular interface 930 may base channel reservations (number, timing, and duration) on the information.

Figure 11:
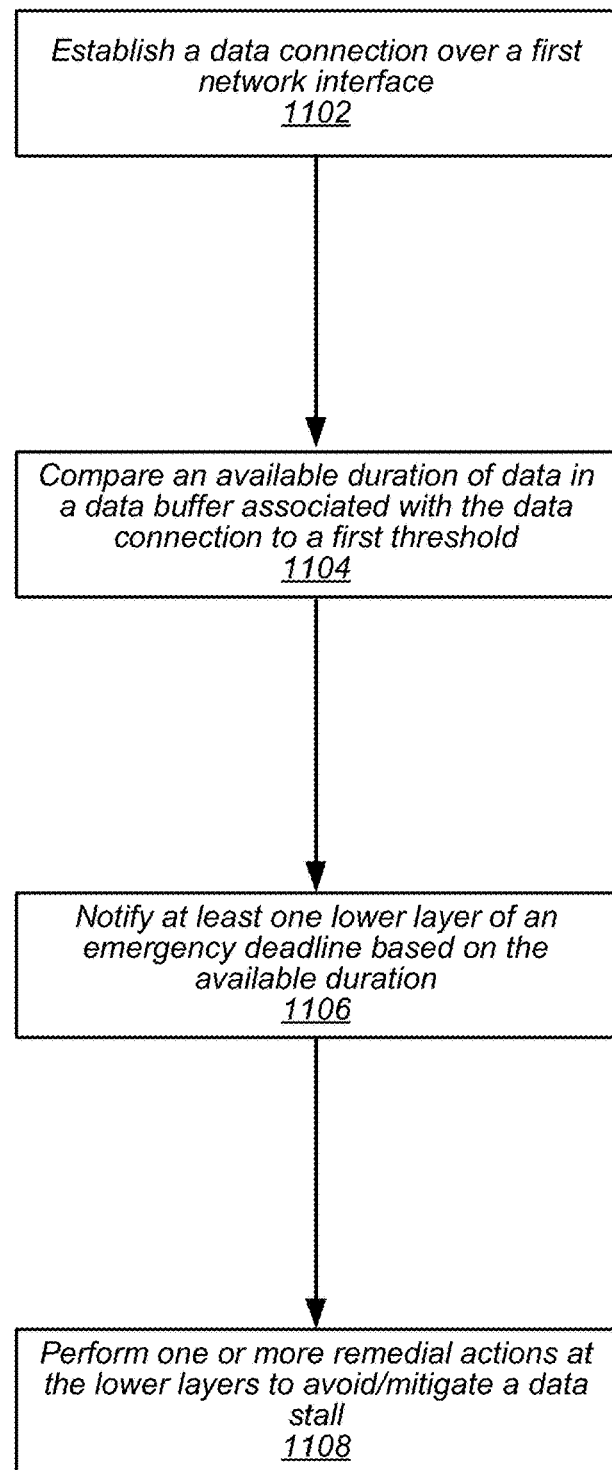
FIG. 11 illustrates a block diagram of an example of a method for mitigating data stalls for a data connection, according to some embodiments.

FIG. 11 illustrates a block diagram of an example of a method for mitigating data stalls for a data connection, according to some embodiments. The method shown in FIG. 11 may be used in conjunction with any of the systems or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a wireless device, such as UE 106, may establish a data connection with a network. The data connection may be established over a first network interface. In some embodiments, the data connection may be initiated by an application executing at an application layer of the wireless device. In some embodiments, the first network interface may be a Wi-Fi interface. In some embodiments, the first network interface may be cellular and/or Bluetooth. In some embodiments, the application may be any application which may use HTTP transactions. In some embodiments, the HTTP transactions may occur via a TCP and/or a UDP connection. In some embodiments, the HTTP transactions may occur via an encrypted byte stream occurring over top a TCP and/or a UDP connection. For example, the application may be a web browsing application, an email application, a media streaming application, a news reader application, a messaging application, a video calling application, a stock ticker application, a mapping application, a gaming application, and so forth.

At 1104, the application layer may compare an available duration of data in a data buffer associated with the data connection to a first threshold.

At 1106, the application layer may notify, in response to the available duration approaching the first threshold, at least one lower layer of the wireless device of an emergency deadline. The emergency deadline may be based, at least in part, on current network conditions and the first threshold. In some embodiments, the emergency deadline may be specified as an absolute time value. In some embodiments, the emergency deadline may be updated periodically. In some embodiments, a periodicity of the update may be based, at least in part, on radio network conditions. In some embodiments, the emergency deadline may indicate an amount of time until a currently acceptable latency becomes unacceptable and/or absolute time value when the currently acceptable latency becomes unacceptable. In some embodiments, the urgency signal may include one or more of bytes required by the emergency deadline, average bitrate; and/or a cost function of user experience to describe (or weight) an impact associated with a possible media/data stall.

At 1108, one or more remedial actions to avoid and/or mitigate a data stall may be performed by at least one lower layer. In some embodiments, the one or more remedial actions may include any, any combination of, and/or all of a network layer of the wireless device re-selecting to a second network interface prior to the emergency deadline, a Wi-Fi interface layer scanning for a new basic service set identifier (BSSID) based on the emergency deadline, a cellular interface attempting a radio access technology upgrade procedure based on the emergency deadline, and/or the cellular interface reserving additional channels for increased throughput based on the emergency deadline. In some embodiments, the second network interface may have a higher cost than the first network interface, where cost may be measured based, at least in part, on battery demands of an interface. In some embodiments, the second network interface may be a cellular interface. In some embodiments, the second network interface may be a Wi-Fi interface and/or another interface, such as a Bluetooth interface, a satellite interface, and so forth.

HTTP Retries for Network Mobility

In some implementations, wireless devices are often mobile and moving through scenarios that include Wi-Fi of varying signal strength, transitioning across Wi-Fi networks, roaming within a Wi-Fi network, transitioning between Wi-Fi and cellular connections, and so forth. Such mobility conditions often hamper successful and timely exchange of HTTP requests and responses over an open TCP connection, especially considering a typical HTTP transaction is a single attempt without a retry. In some implementations, an HTTP stack may include logic to assess if an HTTP request can be safely retried. Additionally, an HTTP stack may be capable of flagging (or marking) a TCP connection as not suitable for reuse. However, HTTP request retries have been limited to retries for specific errors and/or due to user interaction. Some implementations additionally include logic (heuristics and/or state machines) to track health of a wireless device's network connectivity. The logic may also have capabilities to influence network path selection, e.g., to use a cellular interface instead of a Wi-Fi interface.

As noted above, in some existing implementations, a software entity may monitor traffic and attempt to assist data connections experiencing low throughput. For example, the software entity may cause a network layer (e.g., via a tiered advisory signal) to establish each new TCP connection on multiple interfaces, racing connections against one another. In some implementations, depending on network conditions, a Wi-Fi interface may be given more preference (e.g., a head start in establishing a connection) over a cellular interface. The preference afforded to the W-Fi interface may decrease as Wi-Fi network conditions worsen. For example, when network conditions are poor, the software entity may send a tier 2 advisory signal to the network layer that causes the network layer to increase the aggressiveness of the cellular interface (the more expensive connection) by reducing a head start afforded to the Wi-Fi interface (the cheaper connection). Conversely, when network conditions are improved (e.g., when network conditions are less severe and/or less poor than situations where a tier 2 advisory may be issued), the software entity may send a tier 1 advisory signal to the network layer that causes the network to decrease the aggressiveness of the cellular interface (the more expensive connection) by increasing a head start afforded to the Wi-Fi interface (the cheaper connection).

Embodiments described herein provide for tighter integration between a monitoring entity, such as monitoring entity 908 described above, and an HTTP stack, such as HTTP stack 904, described above. In some embodiments, the monitoring entity may issue advisory signals at multiple tiers and/or levels (e.g., a first level may indicate that a Wi-Fi interface and a cellular interface should race for a connection, with Wi-Fi given much more preference in the race whereas a second level indicate that a Wi-Fi interface and a cellular interface should race for a connection, with Wi-Fi given slight preference in the race) that may increase as network conditions degrade. In some embodiments, each advisory signal may be acted upon by the HTTP stack. In some embodiments, HTTP requests may be automatically retried (proactively) in response to poor conditions. In some embodiments, retries may use new TCP connections (which may use a different network interface than a current TCP connection). In some embodiments, a retry may occur silently, e.g., a client of an HTTP application programming interface (API) may be unaware that the retry is occurring. In some embodiments, if an HTTP request cannot be safely retried, the HTTP stack may flag (or mark) an associated TCP connection as unsuitable for reuse by subsequent HTTP transactions.

Benefits associated with such embodiments may include:
(1) no changes to clients' HTTP APIs (e.g., with respect to both use and behavior);
(2) client may be unaware that retry has occurred;
(3) extra data consumption may be minimized, as retries only occur in response to advisory signal from the monitoring entity (4) applies to all forms of data connections, e.g., web browser, media streaming applications, news readers, messaging, third-party applications, and so forth; and
(5) compliance with current HTTP specifications (e.g., RFC2616 Section 9.1.2).

Additional benefits may include a reduction of data stalls in mobility scenarios as well as connection robustness without degrading user experience. In addition, a wireless device may not experience a significant increase in cellular data consumption or a significant impact to power consumption (e.g., battery charge cycle duration).

Figure 12:
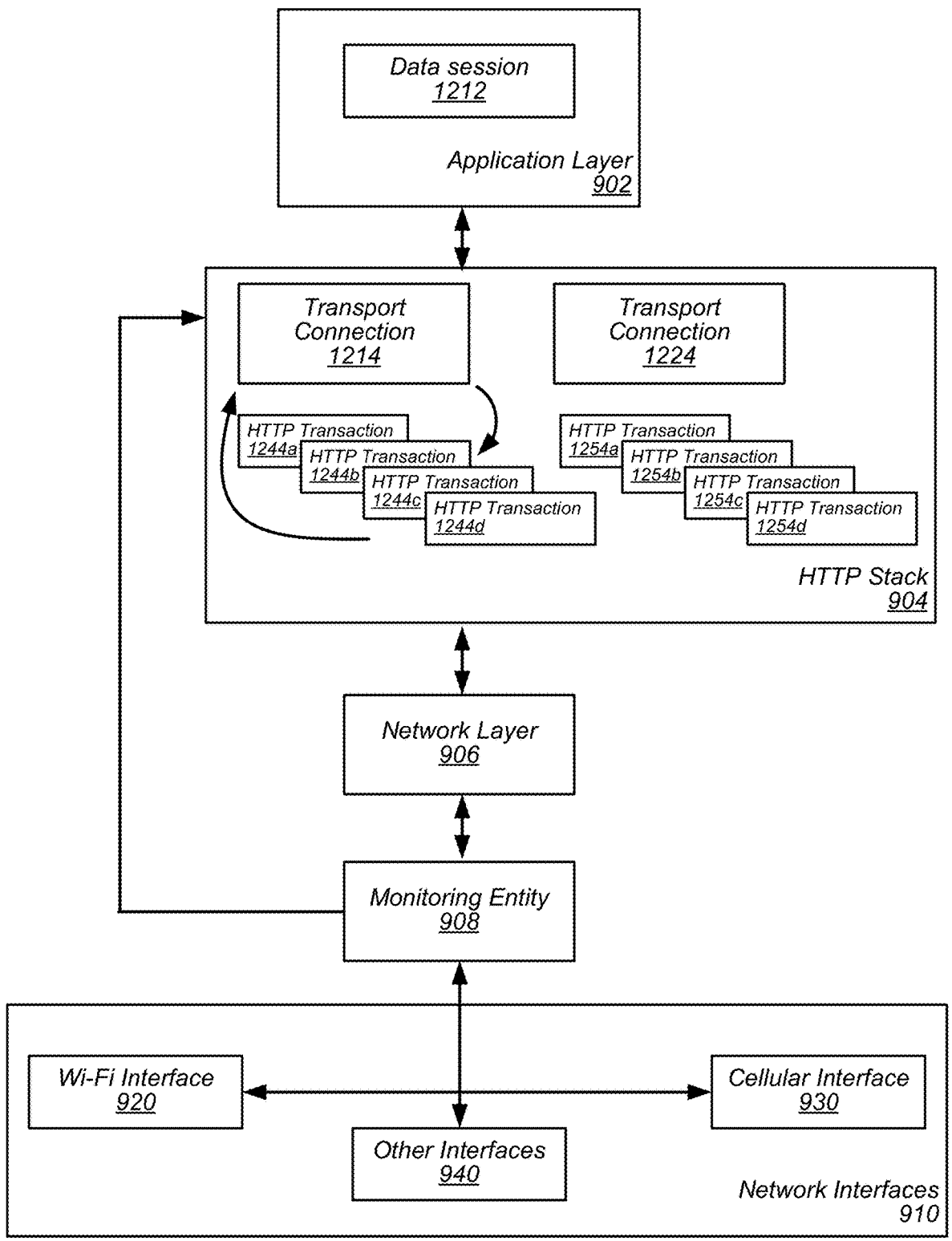
FIGS. 12-14 illustrate various examples HTTP retries, according to some embodiments.
Figure 13:
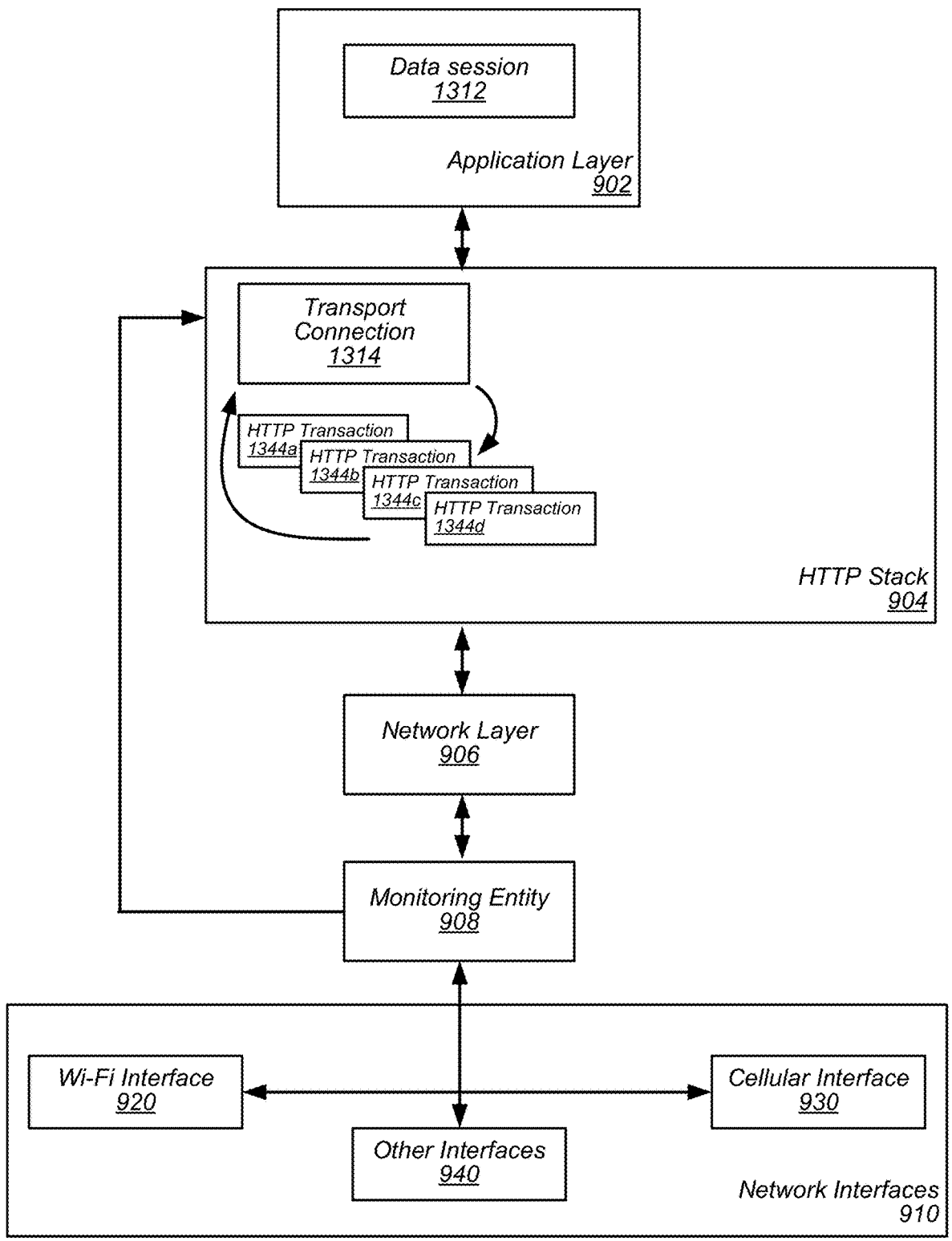
Figure 14:
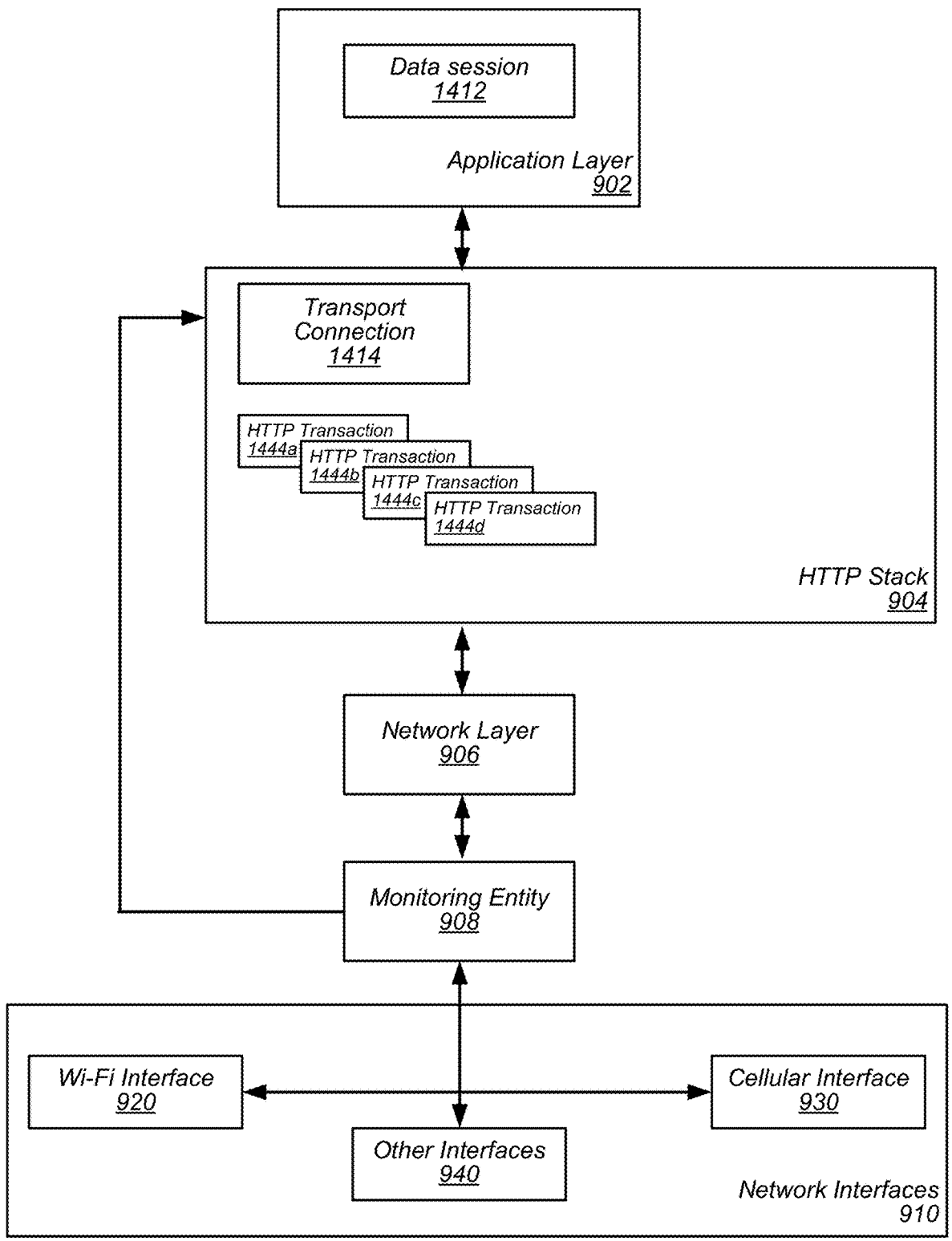

FIGS. 12-14 illustrate various examples of HTTP retries, according to some embodiments. The examples illustrated in FIGS. 12-14 may be used in conjunction with any of the systems or devices shown in the Figures, among other devices.

As shown in FIG. 12, application layer 902 may initiate a data session 1212 (e.g., an application such as a web browser or audio/video streaming application, but not limited to these). HTTP stack 904 may support a first transport connection 1214 (e.g., a TCP connection, a TLS/TCP connection, UDP connection, a QUIC connection and/or any other type of connection that may support an HTTP transaction as defined herein). In some embodiments, Wi-Fi interface 920 may support transport connection 1214. Transport connection 1214 may initiate various HTTP transactions 1244*a-d*. As shown, as network conditions degrade, monitoring entity 908 may issue an advisory signal at a second tier of advisory to transport connection 1214. In response to the advisory signal, HTTP stack 904 may check each HTTP transaction 1244*a-d* to determine which HTTP transactions may be safely retried. In response to determining that any and/or all HTTP transactions may be safely retried, HTTP stack 904 may terminate transport connection 1214. Note that in the case of protocols HTTP/1.0 and/or HTTP/1.1, all transactions using a transport connection must satisfy the retry condition in order to proceed with termination. However, in the case of HTTP/2 (and/or potentially other future protocols), transactions are independently multiplexed on the same transport connection and any transaction which can be retried will be terminated and retried (and the connection will be terminated only if all transactions retry). In some embodiments, HTTP stack 904 may silently terminate HTTP transactions 1244*a-d* and each HTTP transaction may be (automatically) retried. Automatic retries of HTTP transactions 1244*a-d* may cause a new transport connection 1224 to be established. In some embodiments, transport connection 1224 may be supported by cellular interface 930. Transport connection 1224 may initiate HTTP transactions 1254*a-d*, which may be retries of HTTP transactions 1244*a-d*. Upon successful completion, HTTP stack 904 may deliver results of HTTP transactions to the application layer 902.

As shown in FIG. 13, application layer 902 may initiate a data session 1312 (e.g., an application such as a web browser or audio/video streaming application, but not limited to these). HTTP stack 904 may support a first transport connection 1314 (e.g., a TCP connection, a TLS/TCP connection, UDP connection, a QUIC connection and/or any other type of connection that may support an HTTP transaction as defined herein). In some embodiments, Wi-Fi interface 920 may support transport connection 1314. Transport connection 1314 may initiate various HTTP transactions 1344*a-d*. As shown, as network conditions degrade, monitoring entity 908 may issue an advisory signal at a second tier of advisory to transport connection 1314. In response to the advisory signal, HTTP stack 904 may check each HTTP transaction 1344a-d to determine which HTTP transactions may be safely retried. In response to determining that one or more HTTP transactions may not be safely retried, HTTP stack 904 may flag (or mark) transport connection 1314 as not suitable for reuse by subsequent HTTP transactions. Note that in the case of protocols HTTP/1.0 and/or HTTP/1.1, all transactions using a transport connection must satisfy the retry condition in order to proceed with termination. However, in the case of HTTP/2 (and/or potentially other future protocols), transactions are independently multiplexed on the same transport connection and any transaction which can be retried will be terminated and retried (and the connection will be terminated only if all transactions retry). In some embodiments, some of HTTP transactions 1344a-d may complete successfully while others may not complete successfully. Upon completion of HTTP transactions 1344a-d, HTTP stack 904 may deliver HTTP transaction results and/or errors to the application layer 902.

As shown in FIG. 14, application layer 902 may initiate a data session 1412 (e.g., an application such as a web browser or audio/video streaming application, but not limited to these). HTTP stack 904 may support a first transport connection 1414 (e.g., a TCP connection, a TLS/TCP connection, UDP connection, a QUIC connection and/or any other type of connection that may support an HTTP transaction as defined herein). In some embodiments, Wi-Fi interface 920 may support transport connection 1414. Transport connection 1414 may initiate various HTTP transactions 1444a-d. As shown, as network conditions degrade, monitoring entity 908 may issue an advisory signal indicating a first tier of advisory to transport connection 1414. In response to the advisory signal, HTTP stack 904 may flag (or mark) transport connection 1414 as not suitable for reuse by subsequent HTTP transactions. In some embodiments, some of HTTP transactions 1444a-d may complete successfully while others may not complete successfully. Upon completion of HTTP transactions 1444a-d, HTTP stack 904 may deliver HTTP transaction results and/or errors to the application layer 902.

Figure 15:
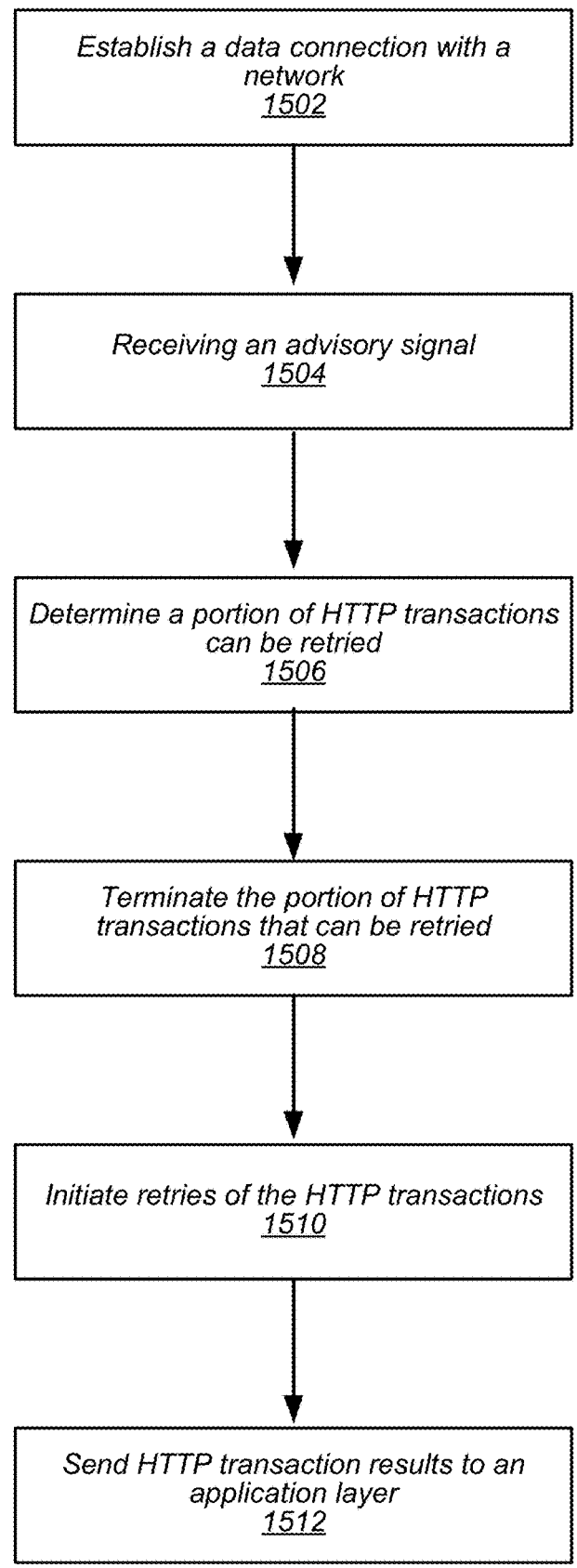
FIG. 15 illustrates a block diagram of an example of a method for mitigating hypertext transport protocol (HTTP) transaction errors for a data connection, according to some embodiments.

FIG. 15 illustrates a block diagram of an example of a method for mitigating hypertext transport protocol (HTTP) transaction errors for a data connection, according to some embodiments. The method shown in FIG. 15 may be used in conjunction with any of the systems or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a wireless device may establish a data connection with a network. The data connection may be established at an HTTP layer (or stack) of the wireless device. In some embodiments, the data connection may be over a first network interface and may be supported by a TCP connection. The TCP connection may support multiple HTTP transactions with the network via the first network interface. In some embodiments, the data connection may be initiated by an application executing at an application layer of the wireless device. In some embodiments, the data connection may be over a first network interface and may be supported by an encrypted byte stream occurring over top of a TCP connection. In some embodiments, the data connection may be over a first network interface and may be supported by a UDP connection. The UDP connection may support multiple HTTP transactions with the network via the first network interface. In some embodiments, the data connection may be over a first network interface and may be supported by an encrypted byte stream occurring over top of a UDP connection. In some embodiments, the first network interface may be a Wi-Fi interface. In some embodiments, the application may be any application which uses HTTP transactions. For example, the application may be a web browsing application, an email application, a media streaming application, a news reader application, a messaging application, a video calling application, a stock ticker application, a mapping application, a gaming application, and so forth.

At 1504, an advisory signal may be received at the HTTP stack of the wireless device. The advisory signal may be generated by a monitoring entity of the wireless device. In some embodiments, contents of the advisory signal may be based, at least in part, on network radio conditions of the first network interface and at least one second network interface of the wireless device. In some embodiments, the at least one second network interface may be a cellular interface. In some embodiments, the second network interface may be a Wi-Fi interface and/or another interface, such as a Bluetooth interface, a satellite interface, and so forth. In some embodiments, the network radio conditions may include any, any combination of, and/or all of Wi-Fi received signal strength indication (RSSI), estimated round trip time of a data packet, channel assessments (CCAs), and/or cellular service state.

At 1506, the HTTP stack may determine that at least a portion of HTTP transactions for the data connection may be (safely) retried, e.g., without error nor violation of the HTTP specification. In some embodiments, the HTTP stack may make the determination based on the advisory signal including first information (e.g., a tier 2 advisory signal). In some embodiments, the first information may be (or include) an indication that network radio conditions for the first network interface may be deteriorating and the HTTP stack should attempt a connection over another network interface. In other words, the first information may indicate that advantages (power, cost, and/or throughput) of the first network interface over another network interface may be reduced, due to network radio conditions, to the point that another network interface may be preferred. In some embodiments, the determination may be triggered by (or responsive to) receipt of an advisory signal including first information (e.g., a tier 2 advisory signal). In some embodiments, when the HTTP transactions are established based on the HTTP/1.0 and/or HTTP/1.1 protocols, the portion of HTTP transactions may include all of the HTTP transactions. In some embodiments, the connection may be terminated when the portion of HTTP transactions includes all of the HTTP transactions. In some embodiments, when the HTTP transactions are established based on the HTTP/2 protocol (and/or potentially other future protocols), any HTTP transaction that can be retried (e.g., independent of any other HTTP transaction using an underlying connection), however, the underlying connection may not be terminated until all HTTP transactions using the underlying connection are complete.

At 1508, the HTTP stack may terminate the portion of HTTP transactions that may be (safely) retried (without error). In some embodiments, the portion of HTTP transactions may be terminated without notifying the application layer of the wireless device.

At 1510, the HTTP stack may retry the portion of HTTP transactions over a new connection (e.g., a new TCP and/or UDP connection). In some embodiments, the new connection with the network may be via the at least one second interface of the wireless device. In some embodiments, the new connection with the network may use a different HTTP protocol version than the version used by the previous connection.

At 1512, the HTTP stack may send results of the HTTP transactions to the application layer.

In some embodiments, the HTTP stack may determine that at least a portion of HTTP transactions for the data connection may not be (safely) retried without error. In some embodiments, the HTTP stack may make the determination based on the advisory signal including first information (e.g., a tier 2 advisory signal). In some embodiments, the determination may be triggered by (or responsive to) receipt of an advisory signal including first information (e.g., a tier 2 advisory signal). In addition, the HTTP stack may flag (mark) the TCP connection (or more generally, any transport connection supported an HTTP transaction) as not suitable for reuse by subsequent HTTP transactions. The HTTP stack may send HTTP transaction results and/or errors to the application layer.

In some embodiments, the HTTP stack may flag the connection (e.g., the TCP or UDP connection) as not suitable for reuse by subsequent HTTP transactions in response to receipt of an advisory signal including information (e.g., a tier 1 advisory signal). The HTTP stack may send HTTP transaction results and/or errors to the application layer. In some embodiments, the second information may be (or include) an indication that network radio conditions for the first network interface may be deteriorating and the HTTP stack should discontinue the current connection. However, attempting a connection over another network interface may not be advantageous. In other words, the second information may indicate that advantages (power cost and/or throughput) of the first network interface over another network interface may be reduced, due to network radio conditions, but not to the point that another network interface may be preferred.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors are configured to cause the UE to:
establish, at a hypertext transport protocol (HTTP) stack of the UE, a data connection over a first network interface of the UE, wherein the data connection is supported by a first transport connection, wherein the first transport connection initiates a plurality of HTTP transactions, and wherein the data connection is initiated by an application executing at an application layer of the UE;
receive, at the HTTP stack, an advisory signal, wherein contents of the advisory signal are based, at least in part, on network radio conditions for the first network interface and at least one second network interface;
determine, responsive to the contents of the advisory signal including first information, that at least a first portion of HTTP transactions of the plurality of HTTP transactions can be retried without error;
terminate, without notifying the application layer, at least the first portion of HTTP transactions;
initiate, via a second transport connection established over the at least one second network interface, retries of the at least first portion of HTTP transactions; and
send HTTP transaction results to the application layer.

2. The UE of claim 1,
wherein the one or more processors are further configured to cause the UE to:
determine, based on the first information, that one or more HTTP transactions of the plurality of HTTP transactions cannot be retried without error;
flag the first transport connection as not suitable for reuse by subsequent HTTP transactions; and
send HTTP transaction results and/or errors to the application layer.

3. The UE of claim 1,
wherein the one or more processors are further configured to cause the UE to:
flag, responsive to the contents of the advisory signal including second information, the first transport connection as not suitable for reuse by subsequent HTTP transactions; and
send HTTP transaction results and/or errors to the application layer.

4. The UE of claim 1,
wherein, when the plurality of HTTP transactions is initiated based on at least one of the HTTP/1.0 or the HTTP/1.1 protocols, the first portion of HTTP transactions includes the plurality of HTTP transactions.

5. The UE of claim 1,
wherein, when the plurality of HTTP transactions is initiated based on the HTTP/2 protocol, the first transport connection is terminated only when the first portion of HTTP transactions includes the plurality of HTTP transactions.

6. The UE of claim 1,
wherein the first network interface comprises a Wi-Fi interface; and
wherein the at least one second network interface comprises at least one of a cellular interface, another Wi-Fi interface, a Bluetooth interface, or a satellite interface.

7. The UE of claim 1,
wherein the application comprises an application which uses HTTP transactions including at least one of a web browsing application, an email application, a media streaming application, a news reader application, a messaging application, a video calling application, a stock ticker application, a mapping application, or a gaming application.

8. The UE of claim 1,
wherein the network radio conditions comprise one or more of:
  Wi-Fi received signal strength indication (RSSI);
  estimated round trip time of a data packet;
  clear channel assessments (CCAs); or
  Wi-Fi Beacon packet error rate (PER);
  cellular service state; or
  cellular link quality and/or congestion state.

9. The UE of claim 1,
wherein the data connection is supported by an encrypted byte stream occurring over top of at least one of a transmission control protocol (TCP) connection or a user datagram protocol (UDP) connection.

10. An apparatus, comprising:
a memory; and
at least one processor in communication with the memory;
wherein the at least one processor is configured to:
  establish a data connection over a first network interface, wherein the data connection is supported by a first transport connection that initiates a plurality of hypertext transport protocol (HTTP) transactions;
  receive an advisory signal, wherein contents of the advisory signal are based, at least in part, on network radio conditions for the first network interface and at least one second network interface;
  determine, responsive to the contents of the advisory signal including first information, that at least a first portion of HTTP transactions of the plurality of HTTP transactions can be retried without error;
  terminate, without notifying an application layer, at least the first portion of HTTP transactions; and
  initiate, via a second transport connection established over the at least one second network interface, retries of the at least first portion of HTTP transactions.

11. The apparatus of claim 10,
wherein the at least one processor is further configured to:
  determine, based on the first information, that one or more HTTP transactions of the plurality of HTTP transactions cannot be retried without error; and
  flag the first transport connection as not suitable for reuse by subsequent HTTP transactions.

12. The apparatus of claim 10,
wherein, when the plurality of HTTP transactions is initiated based on at least one of the HTTP/1.0 or the HTTP/1.1 protocols, the first portion of HTTP transactions includes the plurality of HTTP transactions; and
wherein, when the plurality of HTTP transactions is initiated based on the HTTP/2 protocol, the first transport connection is terminated only when the first portion of HTTP transactions includes the plurality of HTTP transactions.

13. The apparatus of claim 10,
wherein the first network interface comprises a Wi-Fi interface; and
wherein the at least one second network interface comprises at least one of a cellular interface, another Wi-Fi interface, a Bluetooth interface, or a satellite interface.

14. The apparatus of claim 10,
wherein the network radio conditions comprise one or more of:
  Wi-Fi received signal strength indication (RSSI);
  estimated round trip time of a data packet;
  clear channel assessments (CCAs); or
  cellular service state.

15. The apparatus of claim 10,
wherein the data connection is supported by an encrypted byte stream occurring over top of at least one of a transmission control protocol (TCP) connection or a user datagram protocol (UDP) connection.

16. A non-transitory computer readable memory medium storing program instructions executable by processing circuitry to cause a user equipment device (UE) to:
  establish, at a hypertext transport protocol (HTTP) stack of the UE, a data connection supported by a first transport connection over a first network interface of the UE, wherein the first transport connection initiates a plurality of HTTP transactions, and wherein the data connection is initiated by an application executing at an application layer of the UE;
  receive, at the HTTP stack, an advisory signal that includes contents based, at least in part, on network radio conditions for the first network interface and at least one second network interface;
  determine, responsive to the contents of the advisory signal including first information, that at least a first portion of HTTP transactions of the plurality of HTTP transactions can be retried without error;
  terminate, without notifying the application layer, at least the first portion of HTTP transactions;
  initiate, via a second transport connection established over the at least one second network interface, retries of the at least first portion of HTTP transactions; and
  send HTTP transaction results to the application layer.

17. The non-transitory computer readable memory medium of claim 16,
wherein the program instructions are further executable to cause the UE to:
  flag, responsive to the contents of the advisory signal including second information, the first transport connection as not suitable for reuse by subsequent HTTP transactions; and
  send HTTP transaction results and/or errors to the application layer.

18. The non-transitory computer readable memory medium of claim 16, wherein, when the plurality of HTTP transactions is initiated based on at least one of the HTTP/1.0 or the HTTP/1.1 protocols, the first portion of HTTP transactions includes the plurality of HTTP transactions; and wherein, when the plurality of HTTP transactions is initiated based on the HTTP/2 protocol, a first transport connection is terminated only when the first portion of HTTP transactions includes the plurality of HTTP transactions.

19. The non-transitory computer readable memory medium of claim 16,
wherein the advisory signal comprises a tier 2 advisory signal.

20. The non-transitory computer readable memory medium of claim 16,
wherein the application comprises an application which uses HTTP transactions including at least one of a web browsing application, an email application, a media streaming application, a news reader application, a messaging application, a video calling application, a stock ticker application, a mapping application, a gaming application; and
wherein the data connection is supported by an encrypted byte stream occurring over top of at least one of a transmission control protocol (TCP) connection or a user datagram protocol (UDP) connection.

* * * * *